United States Patent
Fujita et al.

[11] Patent Number: 5,903,538
[45] Date of Patent: *May 11, 1999

[54] AUTOMATIC DISK CHANGE APPARATUS AND DISK TRAY FOR THE APPARATUS

[75] Inventors: Makoto Fujita, Nara; Yasuhisa Fukushima; Goro Naoki, both of Osaka; Yoshio Umeda, Hyogo; Kozo Ezawa, Osaka, all of Japan

[73] Assignee: Matsushita Electric Industrial Co., LTD., Osaka, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/571,453

[22] Filed: Dec. 13, 1995

[30] Foreign Application Priority Data

Dec. 14, 1994 [JP] Japan ................................. 6-310394
Mar. 10, 1995 [JP] Japan ................................. 7-051257
Jun. 27, 1995 [JP] Japan ................................. 7-160420
Jun. 29, 1995 [JP] Japan ................................. 7-163452

[51] Int. Cl.⁶ ............................ G11B 17/03; G11B 17/26
[52] U.S. Cl. ............................ 369/178; 369/36; 369/192
[58] Field of Search ................................. 360/133, 99.02, 360/99.06; 369/291, 33, 34, 36, 38, 77.2, 77.1, 178, 179, 191, 192

[56] References Cited

U.S. PATENT DOCUMENTS

| | | | |
|---|---|---|---|
| 4,685,095 | 8/1987 | Rudy et al. ................................. | 369/36 |
| 4,800,554 | 1/1989 | Yamasaki et al. ......................... | 369/36 |
| 4,827,453 | 5/1989 | Motoyoshi et al. ....................... | 369/36 |
| 5,099,465 | 3/1992 | Geiger et al. ............................. | 369/36 |
| 5,289,451 | 2/1994 | Ashinuma et al. ................... | 369/44.29 |
| 5,499,233 | 3/1996 | Childers et al. ........................ | 360/133 |
| 5,548,571 | 8/1996 | Mistretta ................................. | 360/133 |
| 5,581,540 | 12/1996 | Daug ...................................... | 369/291 |

FOREIGN PATENT DOCUMENTS

| | | |
|---|---|---|
| 0 285 866 | 10/1988 | European Pat. Off. . |
| 0 541 208 | 5/1993 | European Pat. Off. . |
| 2 575 857 | 2/1986 | France . |
| 42 05 912 | 8/1992 | Germany . |
| 61-73265 | 4/1986 | Japan ................................. 360/133 |
| 4-69860 | 3/1992 | Japan . |
| WO 88 09033 | 11/1988 | WIPO . |
| WO 93 08569 | 4/1993 | WIPO . |

OTHER PUBLICATIONS

Patent Abstracts of Japan, vol. 013, No. 590 (P–984), JP 1–251367, Oct. 6, 1989.
Patent Abstracts of Japan, vol. 016, No. 281 (P–1375) JP 4–74348, Mar. 9, 1992.

Primary Examiner—David L. Ometz
Attorney, Agent, or Firm—McDermott, Will & Emery

[57] ABSTRACT

An automatic disk changer has a recording/reproducing device capable of operating a reproducing-only disk and a recording/reproducing possible disk, disk trays that can be placed on the recording/reproducing device, and each of which has a disk-type discriminating means able to discriminate as to whether the disk could be a reproducing-only disk or a recording/reproducing possible disk, a tray storage holding the disk trays, and a tray carrier able to pullout/insert the disk trays from/into the tray storage and able to transport the disk tray to/from the recording/reproducing device.

4 Claims, 17 Drawing Sheets

SIDE VIEW

SIDE VIEW

FIG. 14
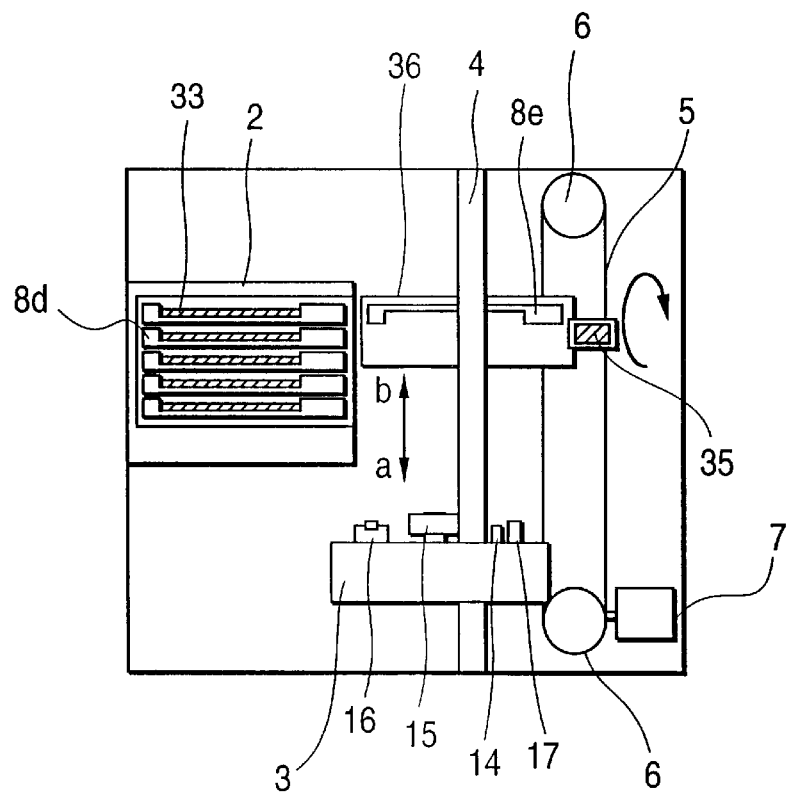
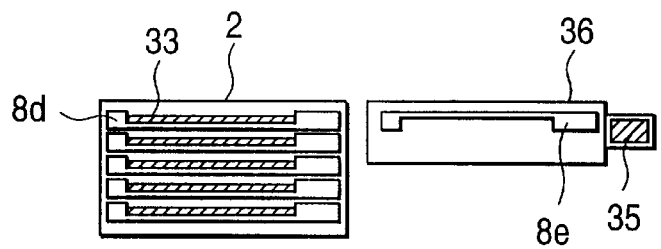
FIG. 15A
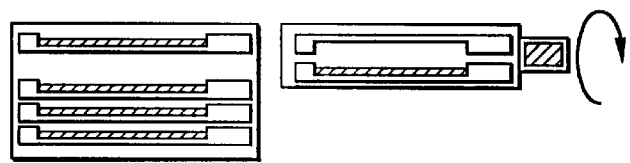
FIG. 15B
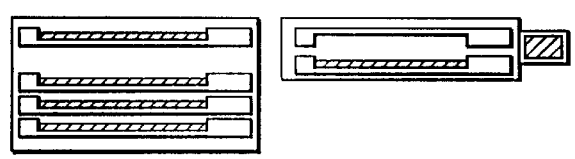
FIG. 15C

AUTOMATIC DISK CHANGE APPARATUS AND DISK TRAY FOR THE APPARATUS

BACKGROUND OF THE INVENTION

This invention relates to an automatic disk changing apparatus for plural reproducing-only or recording/reproducing possible optical disks such as CD-ROMs, magneto-optical disks, phase change optical disks, etc, and a disk tray for the automatic disk changing apparatus. In addition to these, this invention relates also to an automatic disk changing apparatus for plural reproducing-only or recording/reproducing possible high-density double-faced optical disks, such as digital optical disks (DVD).

The applications of optical disks are now rapidly expanding, since the disks are now available, not only for use as the external memory of a computer, but also as the image processing medium utilizing its extremely high memory capacity and processing speed. Such a recording/reproducing capability became possible recently. Even an automatic disk changing apparatus (hereinafter, autochanger in short) for holding high volume optical disks, which makes the management and operation of high volume data possible, is now commercially available.

Two types of known autochangers are now available, i.e., a cartridge type autochanger holding plural cartridges in a cartridge storage, each of which includes an optical disk, and a tray type autochanger holding plural detachable trays in a so-called magazine, each of which has an optical disk therein.

The former is used mostly in an autochanger dedicated to the recording/reproducing possible optical disks, such as the magneto-optical disk and the phase change optical disk. The later is used an autochanger dedicated for reproducing-only optical disks, such as a CD-ROM.

In the cartridge type autochanger, such as shown in Japanese Laid-Open Utility Patent Hei 3-45319 dealing optical disks, a cartridge is pulled out by an instrument called a picker, and the pulled out cartridge is placed on a data processing drive, wherein processes, such as the recording or reproducing of data, are executed. In a case where the disk is a double-face type of disk, wherein recording/reproducing on both surfaces is possible, the cartridge can be reversed by reversing the picker so that a recording/reproducing process can be performed on each of the double surfaces.

Moreover, a cartridge provided with a write-protect tug, confirming the recording possibility of internally held recording/reproducing possible optical disks, is shown in the Japanese Laid-Open Utility Patent Hei 2-92887. By providing a write protect tug and by using a drive adapted for this, the possibility of erratic data erasing can be prevented beforehand.

However, with such autochangers, the occupied device volume per disk is inevitably large so that a problem, such as a excessively large volume of high-capacity autochanger, is possible. Moreover, since the drive is operational only for recording/reproducing optical disks, such as the magneto-optical disk and the phase change optical disk, a reproducing-only optical disk, such as a CD-ROM, cannot be stored and processed together with a disk of another type. Hence, an autochanger of this type would not be able to meet with various applications that will be possible in the coming multimedia age.

On the other hand, with the tray-type autochanger dealing optical disks, as shown in Japanese Laid-Open Utility Patent Hei 3-212847, for example, a number of trays having individual optical disks are held within the autochanger of this type. One of the trays is fetched by the picker and is placed on the drive and processed. Since the volume per disk occupied by an autochanger of this type is much less than that of before-mentioned autochanger, this would be advantageous with respect of the volume reduction of a device.

However, since the drive is operational only with reproducing-only optical disks, such as CD-ROMs, excluding the recording/reproducing type of optical disks, such as magneto-optical disks and phase change optical disks, a problem, such as the impossibility of recording and storage of high capacity data, including video images, is inevitable. Moreover, since only reproducing-only disks can be held in the tray adapted for this device and these disks cannot be discriminated from the recording/reproducing possible optical disks, this could be another problem.

Furthermore, since optical disks having double surfaces, such as the digital optical disk (DVD) are coming in the near future, requiring a disk reversing means, the automatic processing cannot be preformed within the changer so that a manual disk reversing process would have to be carried out after taking out of the device.

SUMMARY OF THE INVENTION

One of the objects of this invention is to offer a compact autochanger capable of mixed operations for reproducing-only optical disks and recording/reproducing possible optical disks.

Another object of this invention is to offer a compact autochanger able to operate with double-faced reproducing-only or recording/reproducing possible optical disks.

Another object of this invention is to offer a tray that can identify the types of optical disks mixed or stored within an autochanger.

Still another object of this invention is to offer a compact autochanger capable of collecting or updating the managing information of optical disks held in said autochanger in a short time and at a low cost.

The invented autochanger comprises a recording/reproducing device capable of operating a reproducing-optical disk and a recording/reproducing possible optical disk, disk trays each of which has a disk type discriminating means to discriminate the type of the disk in the tray, e.g., whether the disk is a reproducing-only optical disk or a recording/reproducing possible optical disk, a tray storage holding the disk trays, and a tray carrier capable of pulling-out/inserting one of the disk trays from/into the tray storage, and capable of transporting the disk tray to/from the recording/reproducing device.

By using the autochanger of this invention, the reproducing-only optical disks can be mixed with the recording/reproducing possible optical disks in operation, so that it is adaptable not only to any data storage devices and memories but to various applications utilizing multi-media data, including video and speech stored in CD-ROM, etc. Since an improved storage efficiency is obtained by employing a new tray system, a compact and high capacity autochanger can be realized.

Moreover, the preferred autochanger comprises a recording/reproducing device capable of operating a disk, a first disk tray having a disk holder, a first tray storage holding the first disk tray, a second disk tray having a disk holder, a second tray storage holding the second disk tray, which is held in an upside-down state opposite to the first disk tray, and a tray carrier transferring the first and second disk trays from the first and second tray storage to the recording/reproducing device.

With the present invention, even the reproduction of a DVD optical disk, on which data are recorded on its double-surface, can be automatically executed without any manual assistance, thereby keeping the advantages of a compact and large capacity tray system.

The effects and advantages of the present invention are now described below by referring the below-shown preferred embodiments and drawings.

BRIEF EXPLANATION OF THE DRAWINGS

FIG. 14 shows a construction of autochanger which is Embodiment-6.

FIGS. 15(A), 15(B), and 15(C) are to explain the operations of autochanger shown in FIG. 14.

DESCRIPTION OF THE PREFERRED EMBODIMENTS

EMBODIMENT-1

Figure 1:
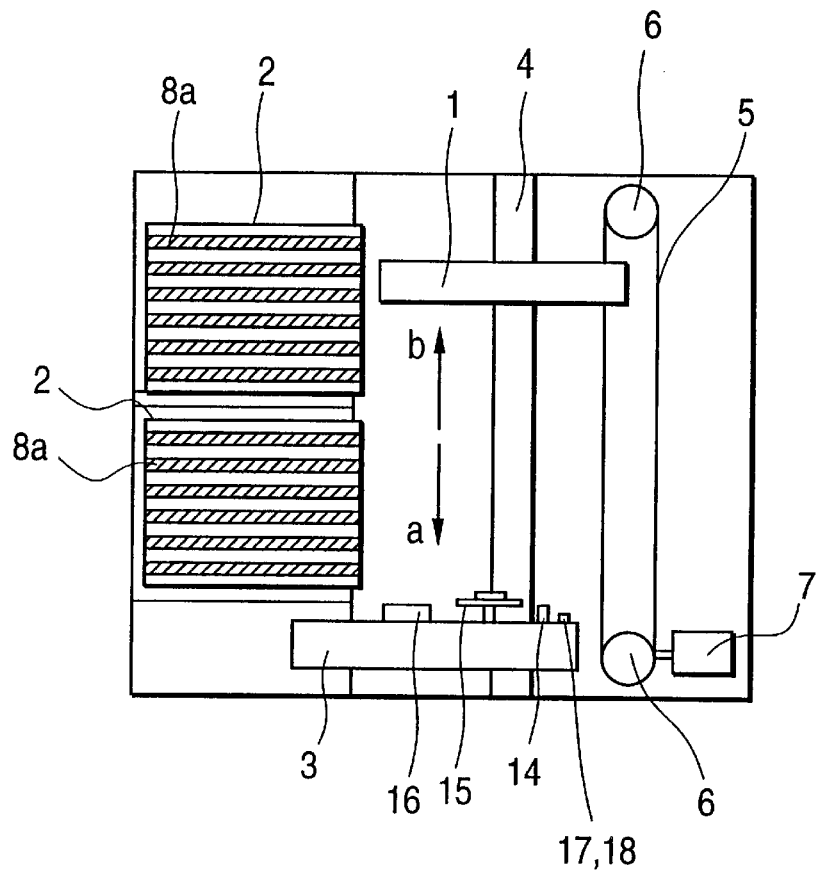
FIG. 1 shows a structure of automatic disk changer, that is, an autochanger which is a first embodiment of the invention.

A first embodiment of the invention is now explained below referring FIGS. 1, 2, and 3. FIG. 1 shows an autochanger which is the first embodiment of the invention. In FIG. 1, tray carrier 1 is guided on guide shaft 4, and is driven by belt 5 through pulley 6 driven by driving motor 7. The tray carrier 1 takes out a tray 8a holding a disk (not shown) from the tray storage, or tray holder, or magazine 2, transports tray 8a in a direction of arrow-(a) and places the tray on the drive 3 for driving a recording-only disk and a recording/reproducing possible disk.

Figure 3:
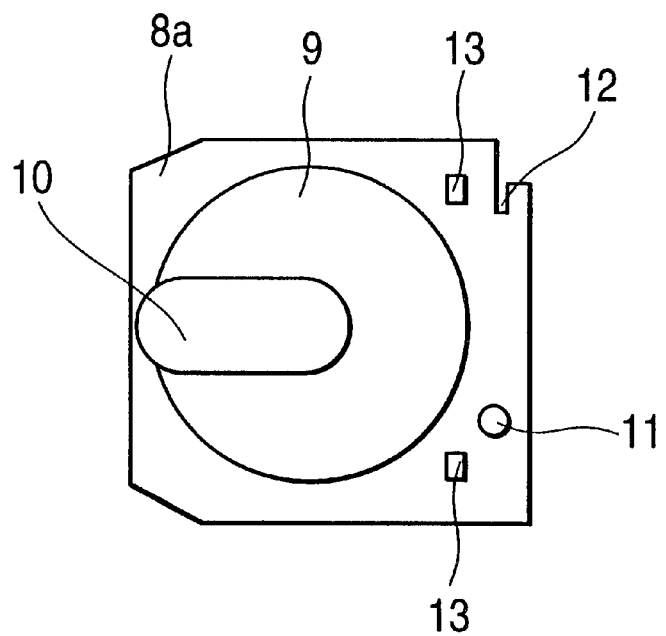
FIG. 3 shows a planar view of the tray used in said autochanger shown in FIG. 1.

As shown in FIG. 3, a depression 9 is provided on tray 8a for the placement of a disk. Moreover, on tray 8a, the opening 10 allows the insertion of pickup 16 of drive 3 and turntable 15, and a positioning hole 13 is for determining the position of the tray to drive 3. Also, a sensor hole 11 for identifying a reproducing-only disk is provided on the tray 8a at a position corresponding to a switch 17 acting as a detector on the drive 3. A notch 12 for enabling the disk pulling-out/insertion operations easily is provided on the tray 8a.

Figure 2:
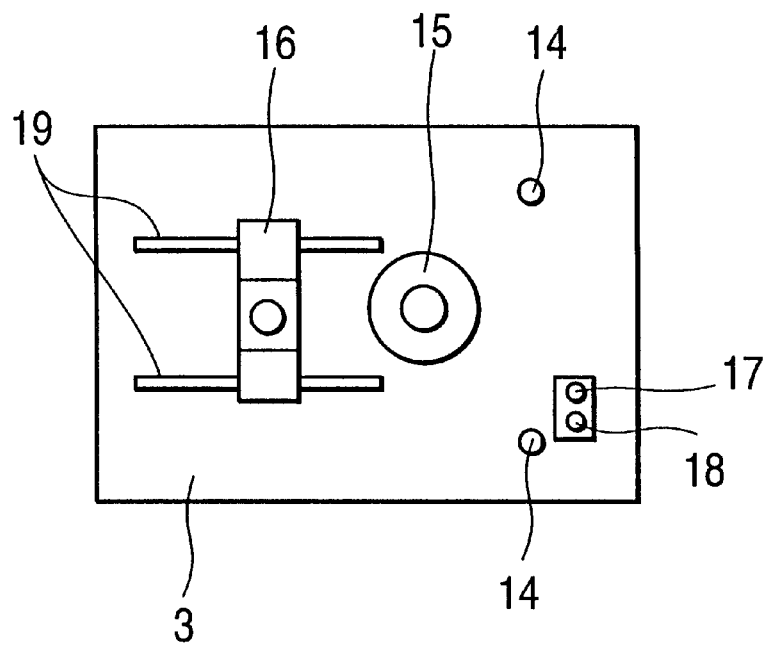
FIG. 2 is a planar view of the recording/reproducing device mounted within said autochanger shown in FIG. 1.

On drive 3, shown in FIG. 2, there are provided a turntable 15 for rotating the disk placed on drive 3, pickup 16 guided by guide 19 for reading the signal from a disk. The pickup 16 is moved in the radial direction relative to a disk by means of a linear motor for example.

Moreover, a positioning pin 14 that corresponds to the positioning hole 13 on tray 8a, switch 17 for determining the type of disk is on the tray, e.g., whether it is a reproducing-only or a recording/reproducing possible disk, and a switch 18 that acts as a detector for determining the possibility of recording/erasing in handling a recording/reproducing possible disk, are also provided on the drive 3.

Next, the operations of this apparatus are explained below. Tray carrier 1 is moved by belt 5 that is driven by motor 7 in either the direction shown by arrow (a) or (b) to a position corresponding to a specific tray 8a. Then, a specific tray 8a, on which a disk (not shown) has been placed in the depression 9 provided on tray 8a, is fetched from the tray storage 2 by utilizing the notch 12 on the tray 8a.

Then, the tray carrier 1 with the fetched holding tray 8a is moved in a direction of arrow (a) and the positioning hole 13 of tray 8a is engaged with positioning pin 14 of drive 3, setting tray 8a on drive 3.

At this time, turntable 15 and pickup 16 of drive 3 are inserted into opening 10, and at the same time, the disk placed on tray 8a is clamped on turntable 15 by using a clamp (not shown) provided on tray carrier 1. Synchronized with this motion, when sensor hole 11 provided on tray 8a is detected by switch 17, the disk placed on drive 3 is confirmed as a reproducing-only disk, such as CD-ROM.

Then, the controllers and the demodulation circuit, including the disk rotation control circuit (e.g., CLV controller) for reproduction controlling the gain of controller and the phase compensation circuit are switched according to the inserted disk. After this, pickup 16 starts the operation of signal reproducing. Moreover, the position of tray 8a on drive 3 is determined at this condition, and is held within tray carrier 1 at a height avoiding the chances of contact with the disk.

The operation of returning tray 8a, after the reproducing operation is ended, is conducted in the following order. As soon as the turntable 15 stops, tray carrier 1 is moved in the direction of arrow (b) by a driving motor 7. After the clamp (not shown), which is clamping the disk onto turntable 15, is disengaged, tray carrier 1 carries tray 8a, which is holding a disk in depression 9, to a predetermined position within tray storage 2. After this, the tray 8a is returned into tray storage 2 by using the notch 12.

Figure 4:
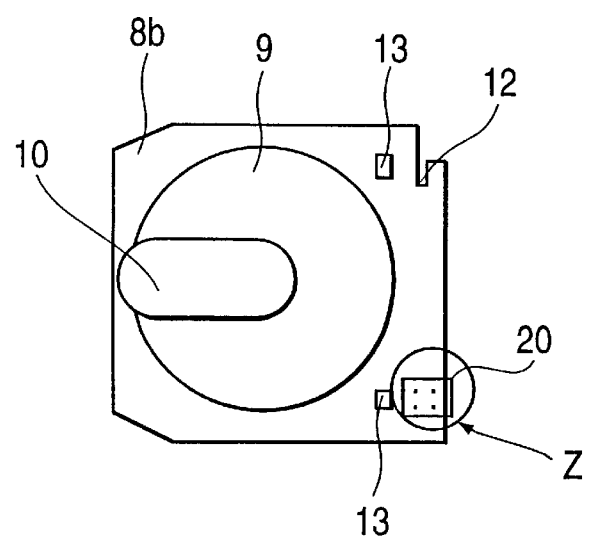
FIG. 4 shows a planar view of another tray used in the autochanger shown in FIG. 1.
Figure 5A:
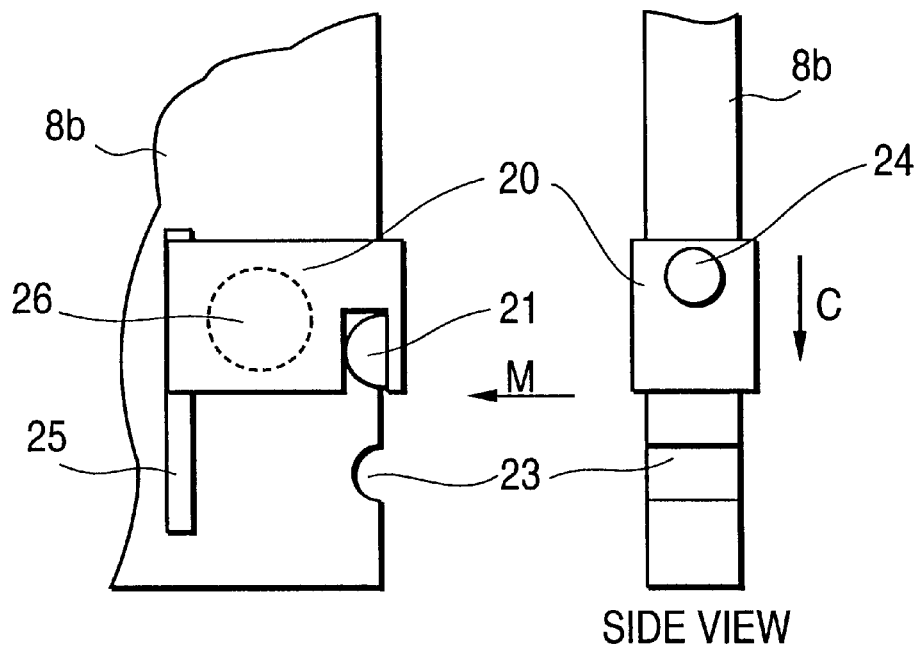
FIGS. 5(A) and 5(B) show partial enlargements of the tray shown in FIG. 4.
Figure 5B:
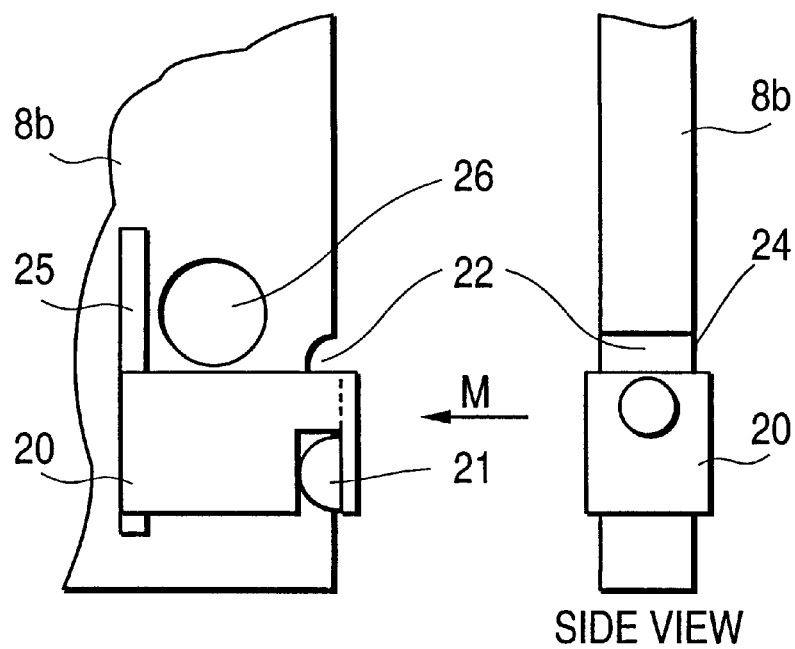

FIG. 4 shows a tray 8b designed for a recording/reproducing possible disk, and FIG. 5 shows an enlarged partial view of the same tray. A detailed structure of the tray for a recording/reproducing possible disk is now described below referring to FIGS. 4 and 5.

Since the tray 8b has some of the same components as those disclosed above for the tray 8a for the reproducing-only disk, the same components in FIGS. 4 and 5 are identified by same numbers, and the individual explanations for these are omitted here.

A sensor hole 26 is disposed on tray 8b at a position facing switch 18 for detecting the recording/erasing operation on drive 3. A slider 20 is disposed to cover sensor hole 26. This slider 20 is freely movable or guided in a guide groove 25. In a normal condition, the sensor hole 26 is kept covered. A locking nail 21, provided together with slider 20, is engaged with depression 22 provided on tray 8b when the sensor hole 26 is covered. In this position, a recording/reproducing possible disk on tray 8b is in a recording/erasing possible condition.

When a user wishes to bring the recording/reproducing possible disk into a recording/erasing impossible condition, the operations described below are carried out.

By using the operation hole 24, which is provided on slider 20, slider 20 is moved against the holding force of the locking nail 21 on depression 22 to the position where the locking nail 21 is engaged with depression 23. This exposes the sensor hole 26. Since the sensor hole 26 is exposed on the surface, it becomes detectable by switch 18 provided on drive 3, and thus, it can be recognized that the recording/erasing of the disk is in an impossible condition.

As a matter of course, the relationship between the sensor hole 26 and the detection switch 18 can be reversed. Thus, needless to say that the relationship is so constructed that the recording/erasing is possible only when sensor hole 26 is exposed.

Since the operations of autochanger using tray 8b designed for a recording/reproducing possible disk are fundamentally identical with that the case employing the before-mentioned tray 8a designed for a reproducing only disk, only the differences between the two trays are now explained below.

At a condition where the sensor hole 26 of tray 8b is covered by slider 20, when tray 8b is placed on drive 3, tray 8b is judged to be in a recording/erasing possible condition by switch 18, and thus, a normal recording/reproducing or erasing operation is conducted.

On the other hand, at a condition where the sensor hole 26 of tray 8b is exposed on the surface, tray 8b is judged to be in a recording/erasing impossible condition. Thus, for example, tray 8b is returned into the original position in tray storage 2 after an error message is sent to the host computer from the autochanger.

As above-explained, by employing a tray system, the space-efficiency of autochanger can be improved substantially, and moreover, by providing a disk-type discriminating means on the tray, a mixed operation of reproducing-only disks and recording/reproducing possible disks within the autochanger becomes possible. Therefore, the autochanger of the present invention can be offered, and the applications of such can be expanded considerably.

The explanations so far have been directed at the structural difference between the tray designed for a reproducing-only disk and the tray designed for a recording/reproducing possible disk, which is very little. However, the number of tray types can be reduced into one type of tray by disposing two sensor holes side-by-side and by changing the structure of the sensor hole 11 provided on tray 8a designed for the reproducing-only disk. The structure of the sensor hole 11 may be changed into the one wherein the setting can be varied by employing a slider having a structure like the one for the sensor hole 26 provided on tray 8b designed for a recording/reproducing possible disk.

In this case, different from the above-given explanation, a different combination of detection polarities of slider and sensor hole is recommended. For example, the recording/reproducing possible condition may well be recognized by the closed conditions of sensor holes 11 and 26, recording/erasing impossible condition by the opened sensor hole 11 and the closed sensor hole 26, and the reproducing—only disk can be recognized by the opened condition of both sensors 11 and 26. These conditions can be realized by storing two empty trays in the tray storage 2 initially and by changing the setting into the one like above-shown later according to the necessity.

Since notch 12 of tray is provided to hold down the tray during the transportation, the shape is not necessarily be limited to the one shown here, but symmetrically with notch 12, the same notch may be provided on the other end of tray. More-over, in a case where either the recording/reproducing possible disks or the reproducing-only disks are inserted in a casing such as a cartridge of determined shape, said cartridge can be used in the invented autochanger without applying any alternations thereto by copying the shapes and positions of the notch and detection holes on a current cartridge.

EMBODIMENT-2

Figure 6:
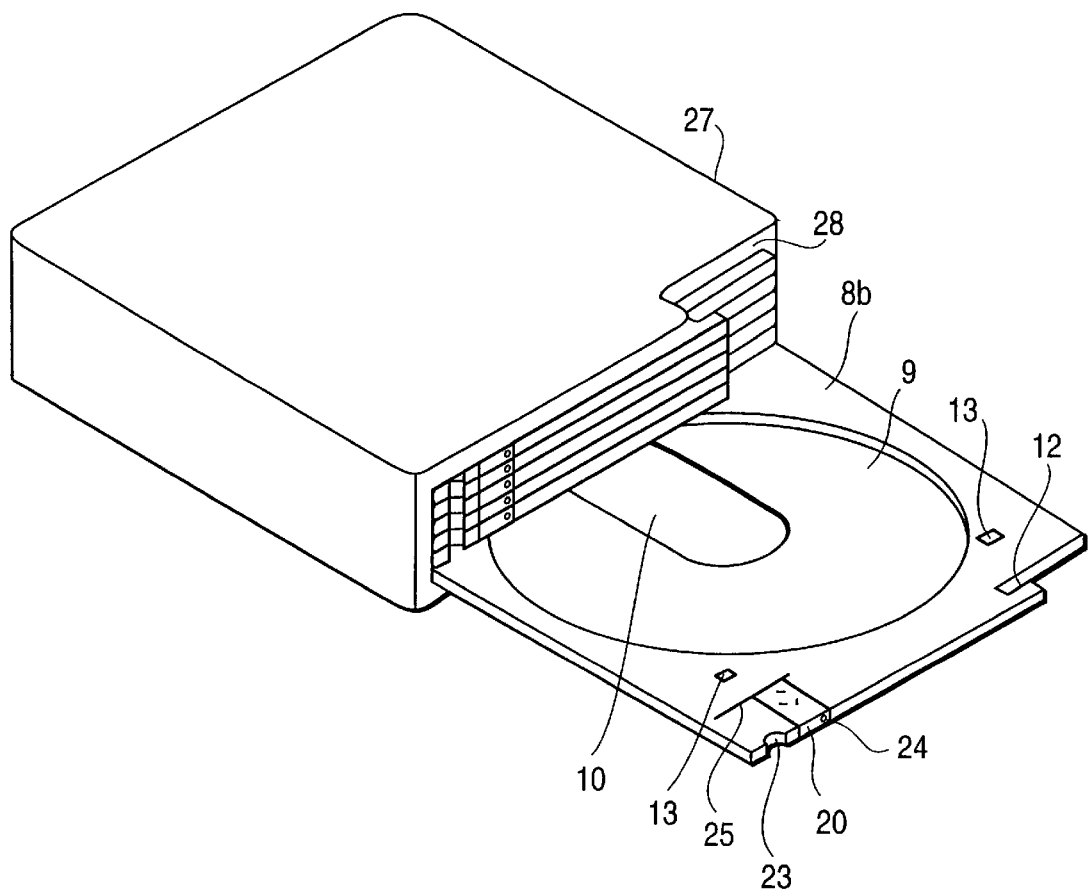
FIG. 6 shows a perspective view of the magazine which is a second embodiment of the invention, holding trays inside.
Figure 7A:
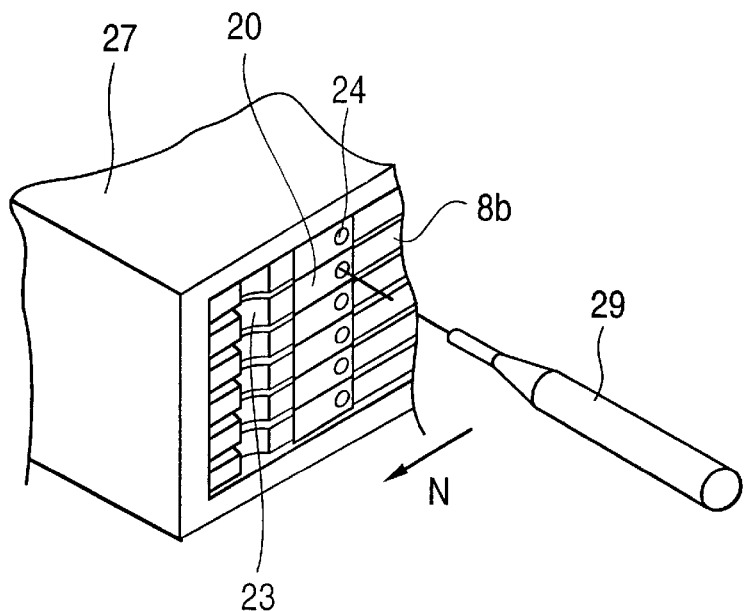
FIGS. 7(A) and 7(B) are to explain the operations of a means to confirm the recording possibility provided on a tray which is in a condition shown in FIG. 6.
Figure 7B:
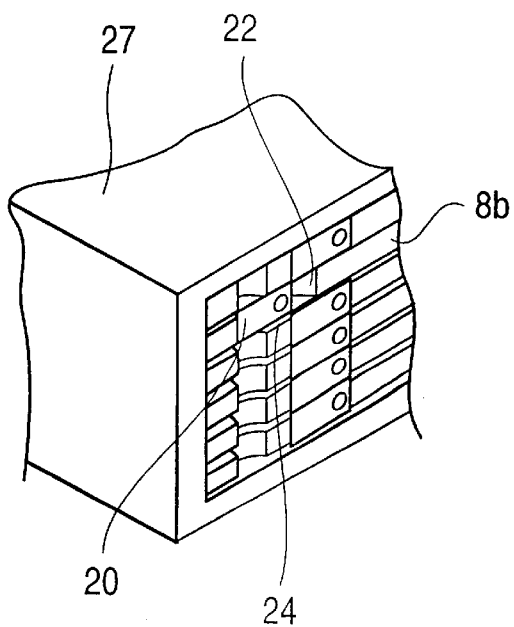

FIG. 6 shows a so-called magazine in which the tray storage holding trays 8b explained in Embodiment-1 are made detachable, and FIGS. 7(A) and 7(B) shows an partial enlargement thereof.

FIG. 6 shows a case where magazine 27 holds six trays 8b, wherein sliders 20 are disposed in a row on the front of each tray. At a condition where trays are stored completely, a lock mechanism (not shown) operates to prevent a user from easily pulling-out a tray 8b. Cutout 28 is provided on magazine 27 in order to make the pulling out of a tray from the magazine by a tray carrier of an autochanger easy. In this manner, the notch 12 is exposed from the shell of magazine 27.

FIG. 7(A) shows a partial enlargement of slider 20, which is in a condition where trays 8b are completely held within magazine 27. The operations of slider 20 is now explained by referring to FIGS. 7(A) and 7(B).

If a user wishes to set the second disk from the top held in the tray in a recording/erase impossible condition, slider 20 of the second tray from the top is moved in a direction shown by arrow (N) to a position explained in the previous section by inserting a mechanical pencil 29 having a very sharp point into the operation hole 24. The completion of this movement is shown in FIG. 7(B).

Under this arrangement or construction, the condition of recording/erasing of the disk can be individually set and easily determined at a result of viewing the set condition of the trays held in the magazine.

EMBODIMENT-3

Figure 8A:
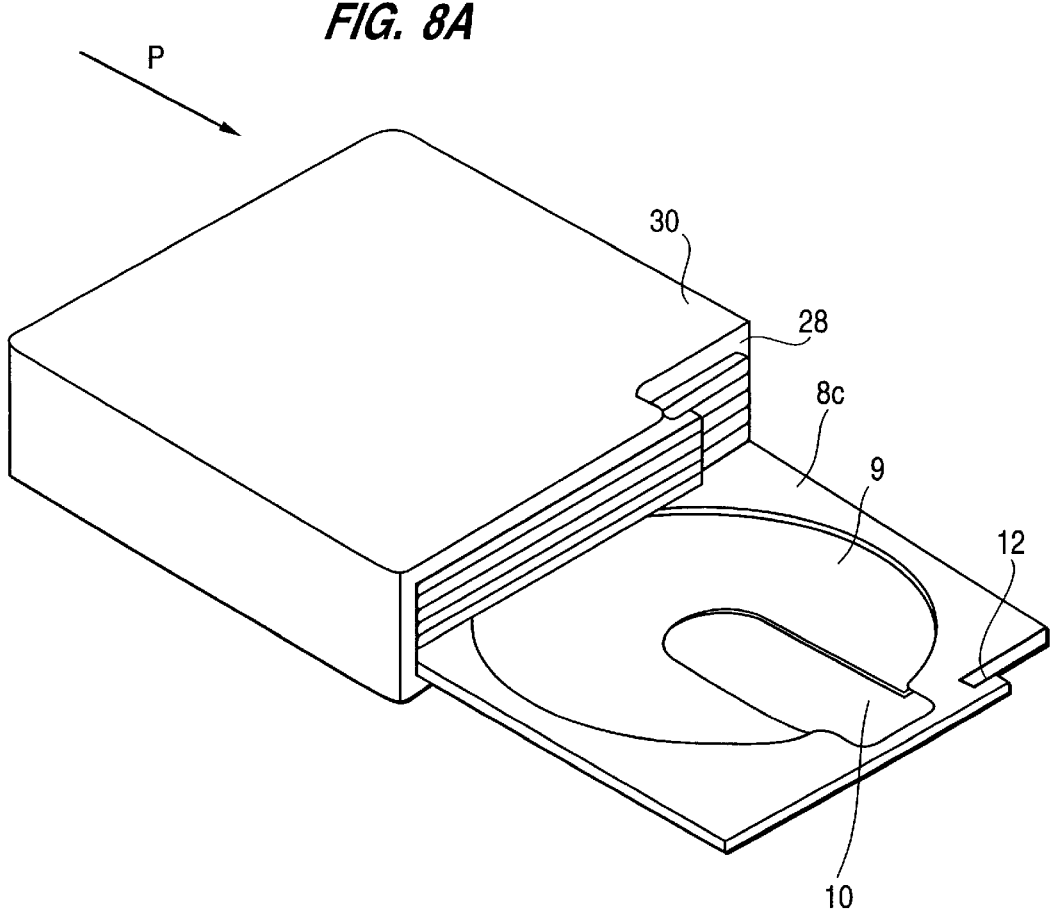
FIG. 8(A) is a perspective view of magazine holding the trays of Embodiment-3 shown in FIG. 4.
Figure 8B:
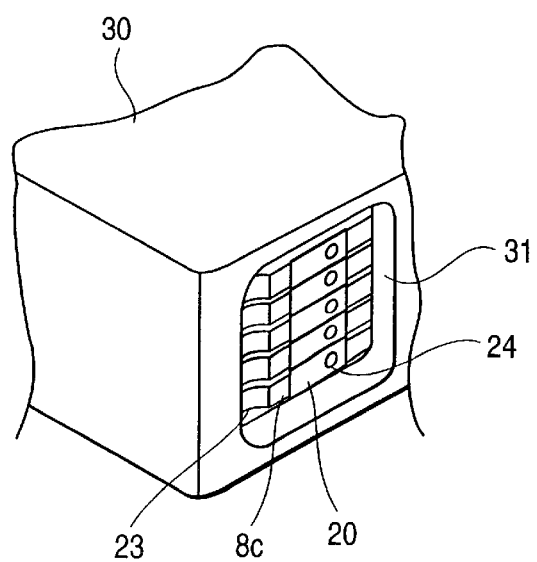
FIG. 8(B) is to explain the operation of said means confirming recording possibility provided on a tray which is in a condition shown in FIG. 8(A).

FIGS. 8(A) and 8(B) show a structure of another magazine, which is different from the magazine of Embodiment-2, and this is now explained by referring FIGS. 8(A) and 8(B).

A partially pulled-out tray 8c for a recording/reproducing possible disk is shown in FIG. 8(A). The tray 8c is held in a magazine 30 with the opening 10 in the tray being on the open side of magazine 30. A sensor hole 26 and slider 20 (not visible) are disposed on the back of the diagonal line P. In this embodiment, the trays are arranged in a direction opposite to the trays 8b in FIG. 6. The tray 8c is arranged in this manner to make the changer operable even if the drive mounted in the autochanger is inserted in a reverse direction. Tray 8c is characterized by the easiness to confirm the possibility of recording/erasing of disk.

In this embodiment, an operating window 31, shown in FIG. 8(B), is provided on the rear of magazine 30. With this construction, all of the sliders 20 placed on trays 8c can be operated through the window 31. This means that the user is able to set the possibility of recording/erasing of disk from the side of magazine without detaching the magazine inserted in the autochanger, and these setting operations are identical with the ones explained in connection with the second embodiment depicted in FIGS. 6, 7(A) and 7(B).

EMBODIMENT-4

Figure 9:
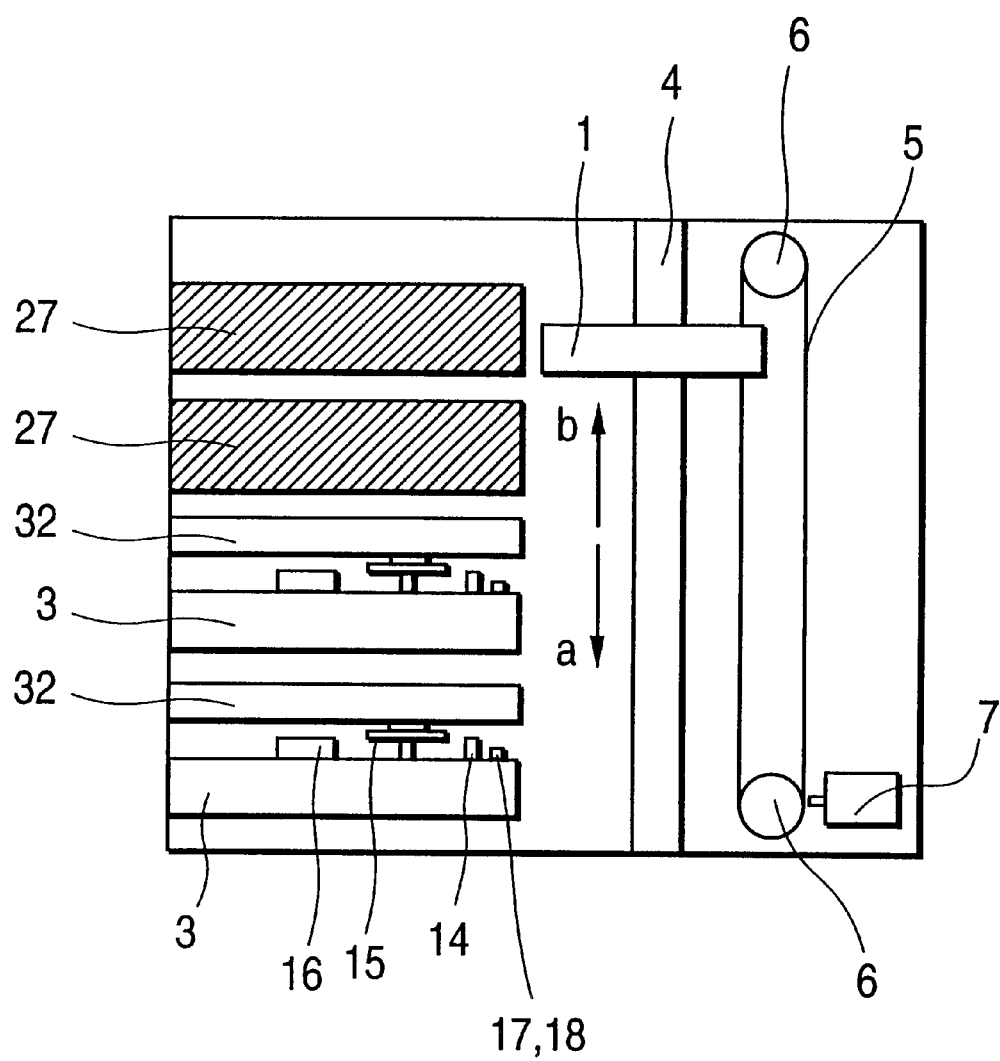
FIG. 9 shows a structure of autochanger of Embodiment-4.

FIG. 9 shows an embodiment of autochanger employing a magazine explained before in connection with FIG. 6.

A cutout 28 (FIG. 6), which makes the aforementioned tray pulling out/insertion operations by tray carrier 1 easier, is provided in each tray held in the magazine 27. A loading mechanism 32 for holding the tray, loading and clamping the disk on turntable 15 is provided on the drive 3. In Embodiment-4, two drives 3 are employed in the autochanger.

The operation of this embodiment is now explained in next. Similar to the case of the first embodiment explained by referring to FIG. 1, a tray carrier 1 takes a tray out of the magazine holding the tray and moves the tray in a direction shown by arrow (a). Then the tray carrier 1 inserts the tray into a specified loading mechanism 32 of drive 3. The loading mechanism 32 clamps the disk on a turntable 15, and at the same time, the recording/erasing possibility of the disk is confirmed by switch 18. When this is affirmed, a recording/reproducing or erasing operation is carried out. However, when this is denied, a denial operation is performed. For example, the tray is returned to the original magazine 27, and at the same time, an error message is sent to the host computer.

With an autochanger of this type, selective insertion of the disk into a specified magazine is possible. Although the construction of autochanger employing magazines, such as are shown in FIG. 6, is explained in FIG. 9, in a case where the autochanger is constructed employing the magazines shown in FIG. 8(A), the drive has to be mounted in a direction opposite to the direction of the drive shown in FIG. 9, and the tray loading mechanism has to be constructed accordingly.

As above explained so far, since an arbitrarily settable recording/erasing possibility confirming means is provided on the trays for recording/reproducing possible disks, no complicated operations such as software-wise management of recording/erasing possibility confirmation are required.

Furthermore, when a number of trays of this type are held in the magazine, the work confirming the possibility of recording/erasing of disk can be carried out from an external side of the magazine without detaching the tray, and this should be one of the advantageous characteristics.

In addition to the above, similar to the autochanger of Embodiment-1, the autochanger of Embodiment-4 has an advantage of the efficient use of space by the tray system. Also, the mixed use of reproducing-only disks and the recording/reproducing possible disks is possible in this case.

Although the explanations so-far have been made relative to the confirmations of the disk type and the possibility of recording/erasing being carried out within the drive, it is also possible to perform the confirmations before the tray is placed on the drive by providing a detection mechanism on the tray carrier 1 or the tray storage 2 shown in FIG. 1.

In this case, the confirmation of such can be performed before the disks are installed on two drives, one of which is used as a reproduction-only drive, and the other of which is used as a recording/reproducing possible drive. This is highly effective to prevent the erratic disk insertion.

EMBODIMENT-5

Figure 10:
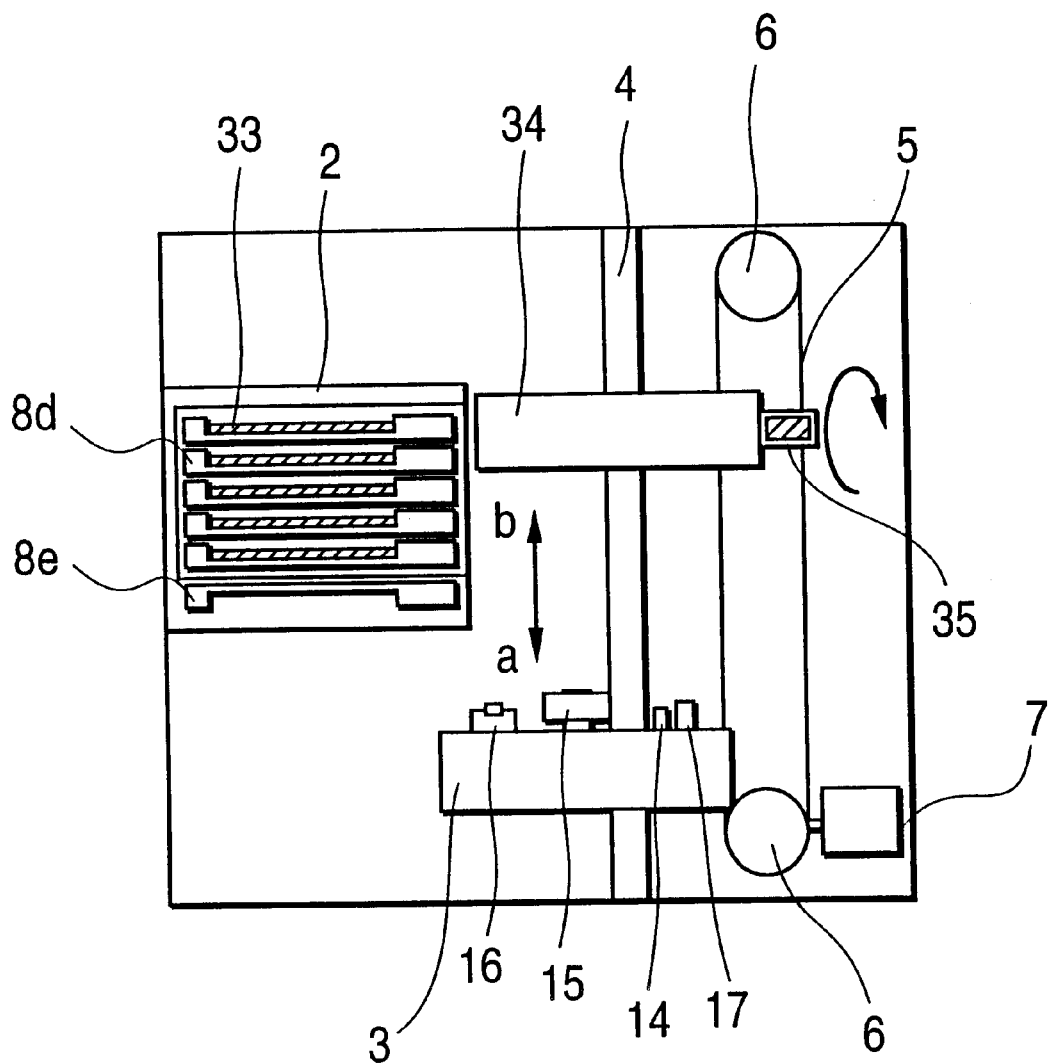
FIG. 10 shows a structure of autochanger of Embodiment-5.

FIG. 10 shows an autochanger of Embodiment-5. In FIG. 10, a tray 8d holding disk 33 is taken out of the tray storage 2 by the tray carrier 34, and is moved in a direction of arrow (a), and is placed on drive 3.

Tray carrier 34 is made to hold two trays 8d simultaneously, and is so constructed that each of these trays 8d can make a 180 degree rotation by means of reversing motor 35. Then, tray 8d is guided along guide shaft 4, and is driven by driving motor 7, through the pulleys 6 and belt 5.

Figure 11:
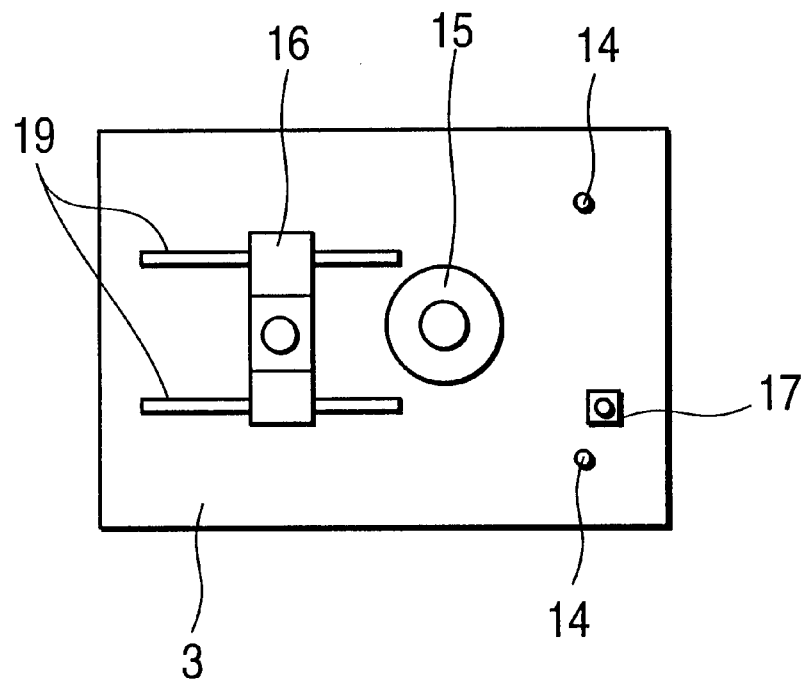
FIG. 11 shows a planar view of recording/reproducing device disposed in an autochanger shown in FIG. 10.
Figure 12:
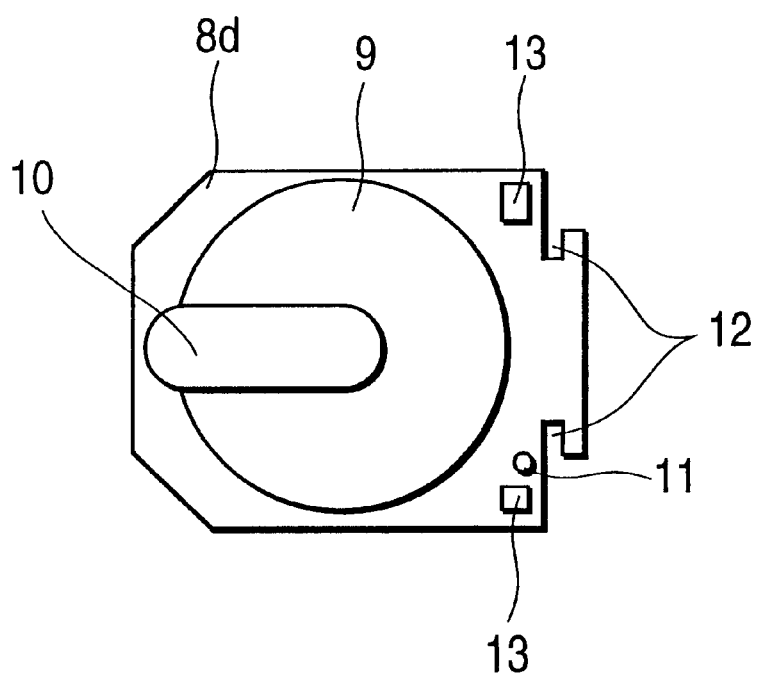
FIG. 12 shows a planar view of the tray used in an autochanger shown in FIG. 10.
Figure 13A:
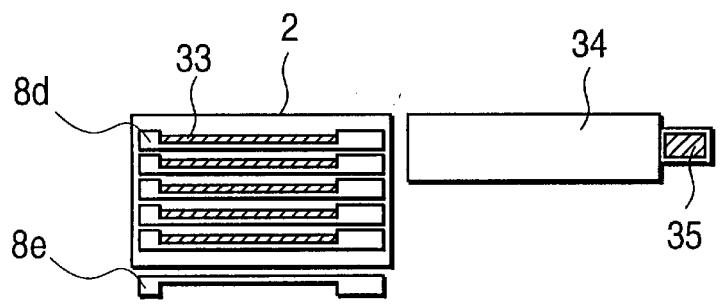
FIGS. 13(A), 13(B), 13(C), 13(D), and 13(E) are to explain the operations of the autochanger shown in FIG. 10.
Figure 13B:
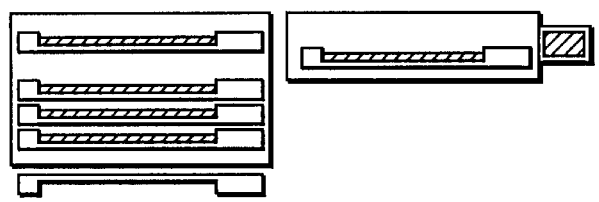
Figure 13C:
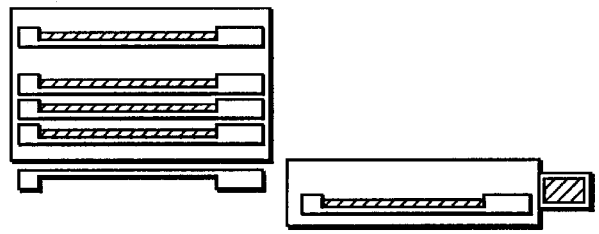
Figure 13D:
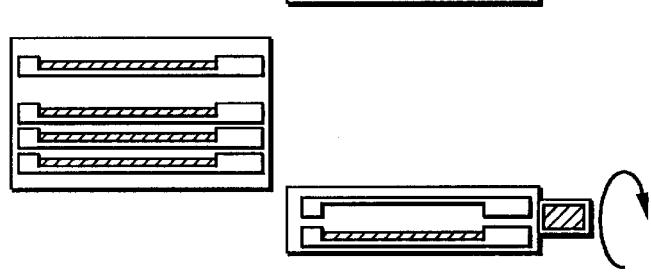
Figure 13E:
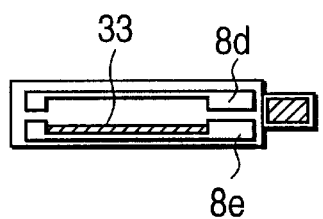

Plural trays 8d holding disks individually thereon are held in tray storage 2 in advance, and at the same time, an empty tray 8e is held in an upside-down condition of tray 8d in a space below the tray storage 2. Depression 9 for holding a disk and, at the same time, opening 10 allowing for the insertions of pickup 16 of drive 3 and turntable 15, are provided on tray 8d, as shown in FIG. 12. A turntable 15 for rotating the disk placed on drive 3, and a pickup 16 guided by guide 19 for reading the signal from a disk, are shown mounted on the autochanger in FIG. 11. The tray 8d depicted in FIG. 12 has: a positioning hole 13 for determining the relative position of the tray to drive 3; a sensor hole 11 for identifying the reproducing-only disk on the tray, wherein the sensor hole 11 is placed in a position on the tray that corresponds to a switch 17 mounted on drive 3; and notches 12 allowing for the taking-out/insertion of the tray from/to the tray storage 2.

In addition to these features, the turntable 15 is guided by a linear motor or such, and the pickup 16, which is guided by the pickup guide 19 in a radial direction of disk, is for reading out signals from the disk. A switch 17 and a positioning pin 14 are further provided on the drive 3 with the positioning pin 14 at a position corresponding to the positioning hole 13 of tray 8d. The type of the disk placed on drive 3 is determined by switch 17, which determines whether the disc is a reproducing-only disk or a recording/reproducing possible disk.

The operation of this autochanger is now explained below by referring FIGS. 10, 11, 12, and 13(A) to 13(E).

The tray carrier 34 is driven by belt 5, which is further driven by a driving motor 7 in either direction of arrow (a) or (b), and is moved to a position of a specified tray 8d. After this, a tray 8d holding disk 33 in the depression 9 thereof is taken out or removed from tray storage 2 by utilizing the notches 12.

In performing a recording/reproducing process on either surface or double surfaces of the taken out disk, tray carrier 34 holding a tray 8d is moved to a direction of arrow (a), positioning hole 13 of tray 8d is engaged with positioning pin 14 of drive 3, and the position of tray 8d relative to drive 3 is determined.

At this time, the turntable 15 of drive 3 and the pickup 16 are inserted into the opening 10, and at the same time, centering of disk 33 placed on tray 8d on turntable 15 is made, and the disk is clamped on turntable 15 by a clamp (not shown) disposed on tray carrier 34.

Synchronized with these operations, the type of disk placed on drive 3 is determined, e.g., whether the disk is a reproducing-only type like a CD-ROM, or a recording/ reproducing possible type. Then, after performing the switching of a rotation control circuit (such as CLV) matched to the disk, the readout of signals are performed by using pickup 16. Moreover, tray 8d in this condition is positioned on drive 3, and is held within tray carrier 34 at a elevated height avoiding the contact with the disk.

The operation of returning the tray 8d to the tray holder 2, after completing the reproduction, is conducted in a manner described next. As soon as the rotation of turntable 15 is stopped, tray carrier 34 is moved to a direction of arrow (b) by the driving motor 7, and the clamp holding the disk onto turntable 15 is released. Then, tray 8d holding disk 33 in depression 9 is transferred to a predetermined position in the tray storage 2, and is returned into tray storage 2 by means of the notches 12.

Next, the operation conducted when the disk 33 held in tray carrier 34 is a double surface disk, and the surface of recording/reproducing is placed on an opposite side to the side normally placed on the turntable (operation by which the recording/reproducing is performed on the rear surface) is explained.

A tray carrier 34 having taken out or removed a tray 8d holding a disk 33 is moved in a direction of arrow (a) by belt 5, and is stopped at a position corresponding to the empty tray 8e. This position is determined by a photocoupler and a mirror not shown here. At this condition, tray carrier 34 moves the empty tray 8e into a position right above the previously removed tray 8d holding disk 33. The tray carrier 34 is then rotated 180 degrees by the operation of a reversing motor 35, and the disk 33 is then transferred from the tray 8d and placed on the empty tray 8e. This means that the disk 33 is reversed and placed on empty tray 8e, and the recording/reproducing of the reversed surface of disk 33 becomes possible after completing the migration or movement of the tray carrier 34 to drive 3.

The storage or return of disk 33 to the tray holder 2 is conducted as follows. Before the disc 33 is returned, a 180 degree reversing operation of tray carrier 34 is performed with the disc being returned to the tray 8d from the tray 8e. Then, the disk 33 is stored into a predetermined position in tray storage 2. By these operations, the disk 33 is stored in the same condition as the initial condition. The series of operations involved in returning the disc to its original position is then completed by returning the empty tray 8e to its original position in the tray storage 2.

By employing an autochanger structure that stores an empty tray in the tray storage, the number of the drives can be increased in accordance what is necessary. Thus, the extra advantage of enabling the recording/reproducing of reversed surfaces on each drive is realized by providing a plurality of empty trays in accordance with the number of drives.

As above-described, by providing a tray carrier that performs a reversing function, an autochanger having a highly space-efficient tray system, and able to perform the recording/reproducing of data on double surface disks, becomes available.

EMBODIMENT-6

Embodiment-6 of the invention is shown in FIG. 14 and FIGS. 15(A)–15(C). Since the components shown in these figures are the same as those in Embodiment-5, the same components are identified with the same numbers as Embodiment-5, and the explanation of such components is omitted here.

Embodiment-6 shows a construction where the empty tray 8e is held in the tray carrier 36, rather than in the disc holder 2. By employing this construction, there is no need for the tray carrier to retrieve an empty tray, and then to return the empty tray following its usage of positioning the reverse side of a disk on a drive. Embodiment-6 provides the advantage of requiring less time to produce a disk change. In particular, this means that the operation of pulling out and returning an empty tray 8e to and from the tray storage 2 is excluded from the total operations, while the other operations remain same as the ones shown in Embodiment-5.

EMBODIMENT-7

Figure 16:
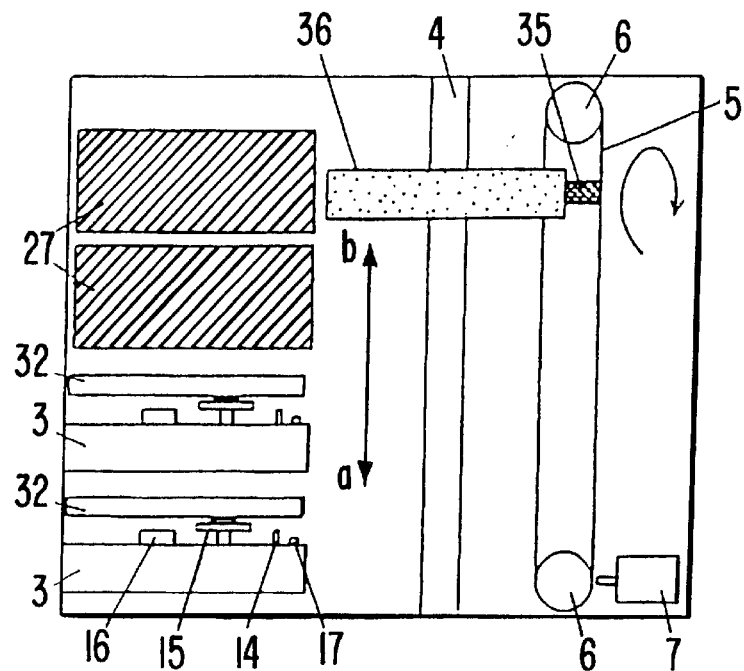
FIG. 16 shows a construction of autochanger which is Embodiment-7.

FIG. 16 shows a typical autochanger equipped with a tray storage in which magazines 27 are detachably mounted. In FIG. 16, each magazine 27 holds a plurality of trays in which disks are individually held. The tray carrier 36 holds an empty tray in advance, as explained in Embodiment-6. A drive 3 holds a tray and a loading mechanism 32 for placing a disk on the turntable 15 and for clamping a disc thereto. Two drives 3 are provided in this autochanger, and the operation thereof is explained in next.

Similar to the case of Embodiment-6, when the recording/ reproducing is to be performed on the surface of the disk placed on the drive, the tray carrier 36, in the case where the desired tray is taken out and inserted on the drive, is left as it is. However, in the case when the recording/reproducing is to be performed on the rear surface of the disk, the disk is transferred into the empty tray by the operation of reversing motor 35.

After the tray carrier is moved in the a direction of arrow (a), the tray is inserted into loading mechanism 32 of drive 3, and then, the disk is clamped on turntable 15 by means of the loading mechanism 32 before the operation of recording/ reproducing is started. In returning the disk, the disk is taken from the drive 3 by the tray carrier 36, and is moved in the direction of arrow (b), and is placed back into a predetermined position of magazine 27. When the rear surface of the disk is used, the disk is transferred to the original tray by the operation of the reversing motor 35, and the tray is returned to its predetermined location in the magazine.

The autochanger of this system is able to insert a desired disk selectively into one of the drives according to the number of drives. Although the structure of an autochanger employing a tray carrier shown in FIG. 14 is explained in FIG. 16, a construction storing an empty tray in the tray storage, as explained in Embodiment-5 and shown in FIG. 10 (a construction providing a space storing plural number of drives under magazine 27), can be employed in this case. Recording/reproducing of the reversed or rear surface of a disk placed on each drive can be performed by performing the operation explained in connection with Embodiment-5.

Although so-far, the explanations of Embodiments 5, 6, and 7 have been made on a precondition that the dimensions of the empty tray and the tray with a disk are the same, in an application where the device is has a large number of drives and a small number of tray carriers, the surface directions of the disks held in the tray storage 2 can be maintained in a predetermined direction by making the of shape of notch 12 different, for example, or by providing another sensor hole and other means.

Though not shown in the drawings, since the disks are delicate and have to be transported constantly within a limited space surrounded by tray 8d and empty tray 8e, it is wise to protect the surfaces of each tray by providing a cushion made of rubber or fiber material. In addition to the above, a mechanism for holding a disks in the tray, when the trays are positioned within the tray carrier, may be added. With such precautions, there will be less chance of damaging a disk during the 180 degrees reversing operation of a disk.

EMBODIMENT-8

Figure 17:
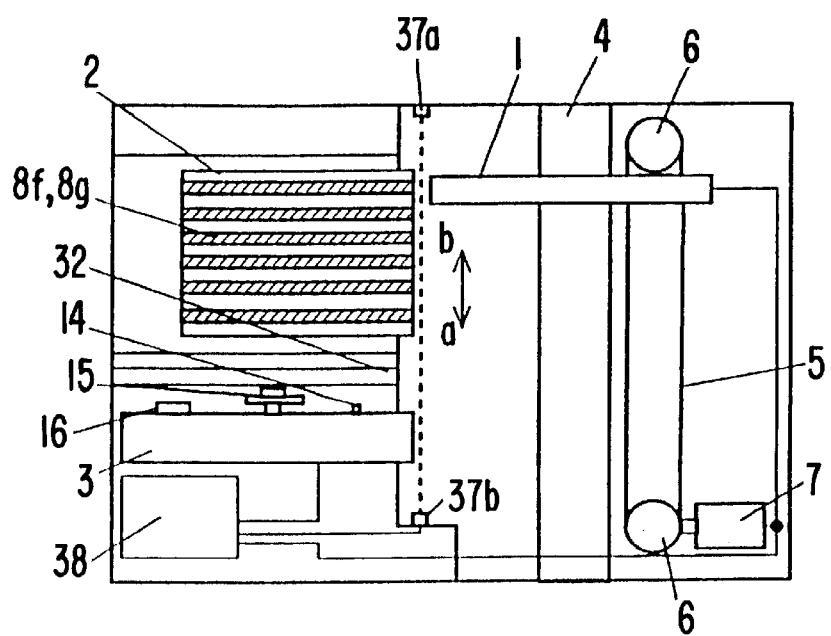
FIG. 17 shows a construction of autochanger which is Embodiment-8.

The structure and operation of Embodiment-8 are now explained below by referring FIGS. 17 and 18. In FIG. 17, a tray carrier 1 pulls out a tray 8f or 8g holding a disk (not shown) stored in a magazine 2. Then the tray carrier 1, moves along a direction shown by arrow (a) to the position of a loading mechanism 32 and drive 3.

Figure 18A:
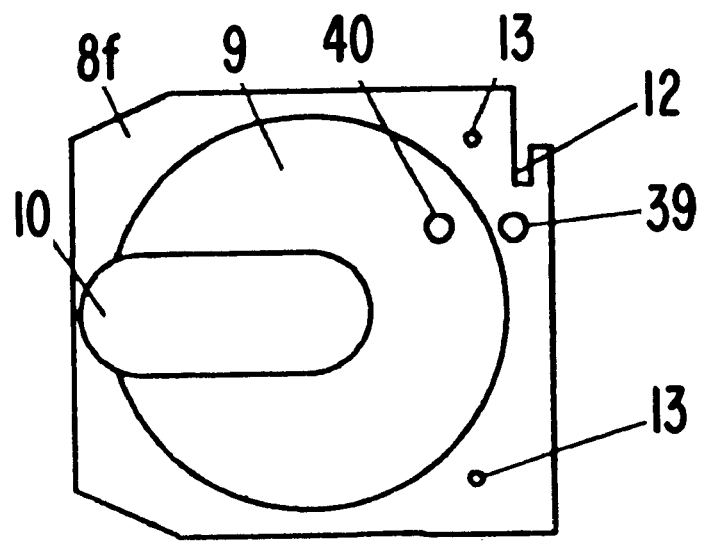
FIG. 18(A) shows a planar view of the tray holding a recording/reproducing possible disk in the autochanger shown in FIG. 17.
Figure 18B:
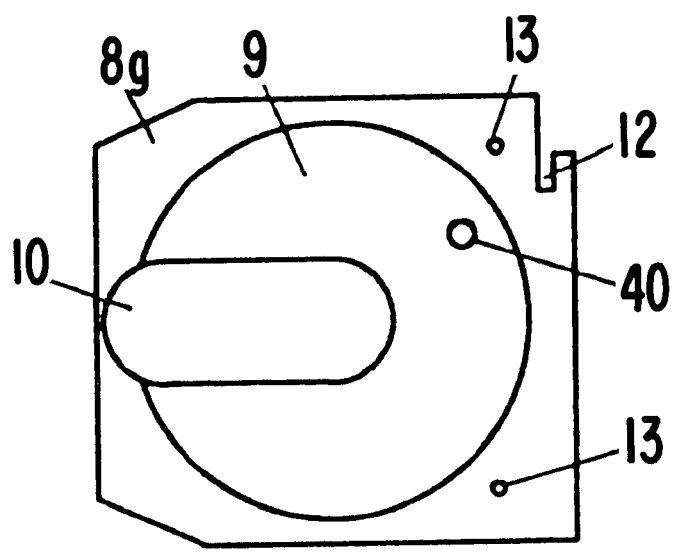
FIG. 18(B) shows a planar view of the tray holding a reproducing-only disk used in the autochanger shown in FIG. 17.

The tray carrier 1 is guided by guide shaft 4 and is driven by a belt 5 and a driving motor 7 through the pulleys 6. As shown in FIGS. 18(A) and 18(B), a depression 9 for holding a disk is provided on tray 8f and tray 8g. Also, an opening 10, which allows the insertions of a pickup 16 of drive 3 and a turntable 15; positioning hole 13 for determining the position of the tray to drive 3; and notch 12, which allows the tray to be pulled-out/inserted from/into the magazine 2 to tray carrier 1; are provided.

Moreover, a turntable 15 for rotating the disk placed thereon, a pickup 16 for reading the signals recorded on the disk, and a positioning pin 14 for determining the relative positions of tray 8f and tray 8g, are provided on drive 3 mounted in the auto-changer. Sensors 37a and 37b are provided at the positions that correspond to the positions of a disk-type discriminating hole 39 (FIG. 18(A)) and disk presence detecting hole 40 (FIG. 18(B)) provided on the trays 8f and 8g.

The tray 8f, shown in FIG. 18(A), is a tray designed for a recording/reproducing possible disk, and the tray 8g, shown in FIG. 18(B), is a tray designed for a reproducing-only disk. In the case of the tray 8g, the disk-type discriminating hole 39 is blocked. Moreover, a controller 38 controlling the operation of autochanger and managing the information of the disks according to the commands from a host computer (not shown) and the operation buttons is provided.

Next, the operations of Embodiment-8 is explained below. When an instruction commanding the placing of a specified disk on the drive 3 is externally inputted to controller 38, the tray carrier 1 is driven by driving motor 7 through belt 5, and is moved along a direction shown by arrows (a) or (b), based on the output signal of controller 38. The tray carrier is brought to a position corresponding to the specified trays 8f and 8g. Next, the tray carrier 1 pulls out trays 8f and 8g, by using notch 12 on the trays, from the magazine 27.

The tray carrier 1, holding trays 8f and 8g, is then moved along a direction of arrow (a), and the trays inserted into loading mechanism 32. The loading mechanism 32 makes the positioning holes of trays 8f and 8g engage with the positioning pin 14 of drive 3, thereby accomplishing the positioning of trays 8f and 8g on the drive 3.

At this stage of the operations, controller 38 sends out an instruction signal to drive 3 to insert turntable 15 and pickup 16 of drive 3 into the opening 10, and at the same time, and to perform the centering of the disk placed on trays 8f and 8g on turntable 15. Then, the disk is clamped on turntable 15 by means of a clamp (not shown) provided on the loading mechanism 32. After this, the turntable 15 is rotated and the signal is readout by using pickup 16. Moreover, trays 8f and 8g are, at this condition, clamped and held at a height avoiding a contact with the disk by means of the loading mechanism 32.

The operation of returning the trays 8f and 8g, after the respective reproductions are performed, is described below. As soon as the operation of the turntable 15 is stopped by an instruction from the controller 38, the clamp holding the disk on the turntable 15 is disengaged, and the tray carrier 1 pulls out trays 8f and 8g and the disks from the loading mechanism 32. Then, the disks are inserted back into trays 8f and 8g, which are transported back to their predetermined positions in magazine 2 and are returned into the magazine 2 by using the notches 12.

Figure 19A:
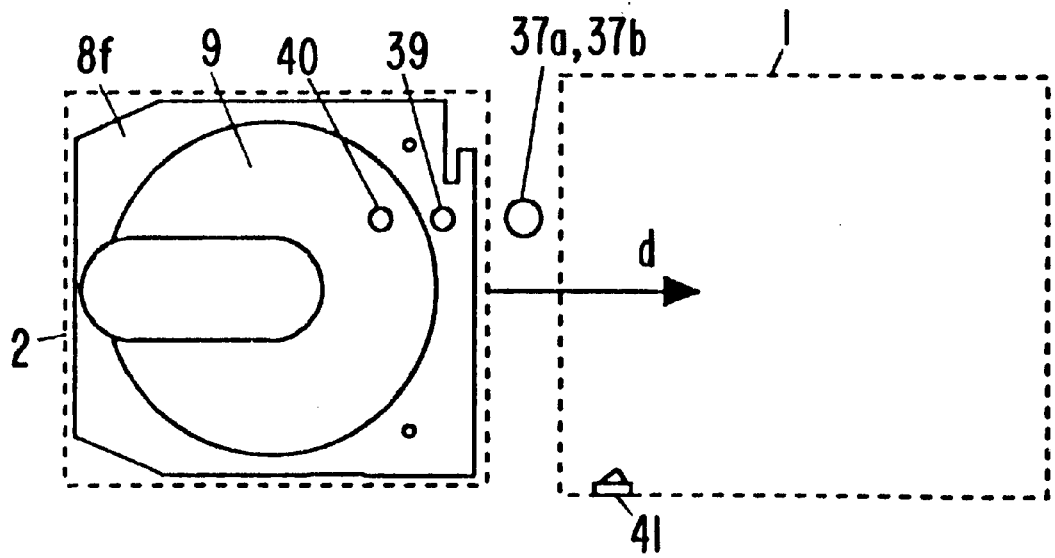
FIGS. 19(A) and 19(B) show an operation of the autochanger shown in FIG. 17 in detecting the disk-insertion and the disk type.
Figure 19B:
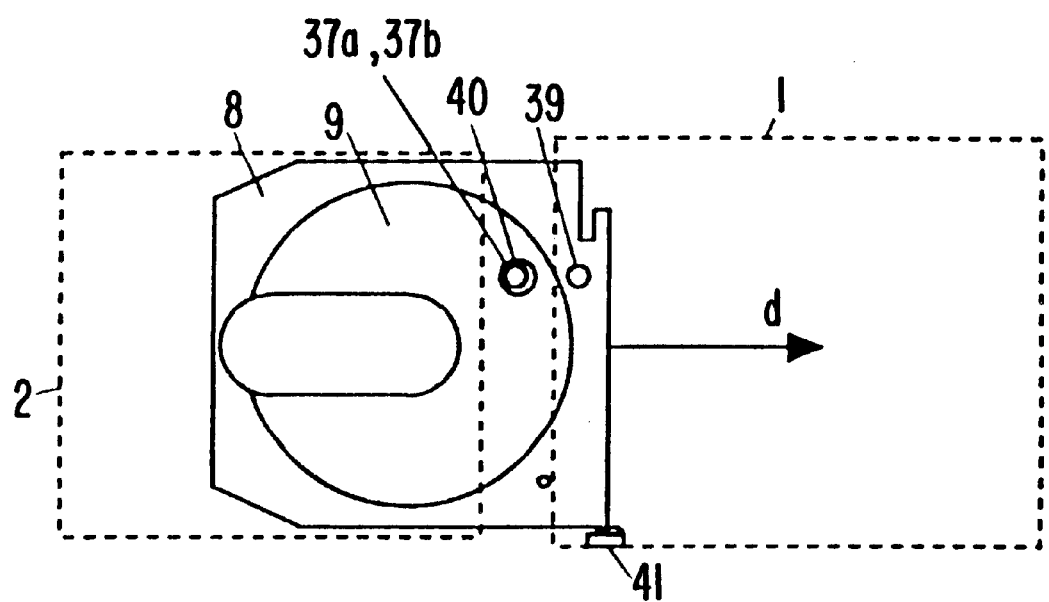

Next, the management work of these disks (such as the storage condition of disks and the types of disks) at the autochanger is now explained below by referring FIGS. 19(A), 19(B) and 20. The explanation of the structure shown in FIGS. 19(A) and 19(B) is described by referring to tray 8f, which is designed for the recording/reproducing possible disks.

A series of operations conducted at the starting of a power supply and the tray exchange including the storage of various information such as the presence and the type of disk and others in controller 38 are called initialization.

Although there is a chance that a disk or tray gets spilled out of a tray or magazine, the above-explained normal disk changing operations would become impossible if such an accident takes place. Therefore, the spilling of a disk or tray from normal positions are monitored constantly by sensors 37a and 37b, and the output signals thereof are monitored constantly by controller 38.

For example, if a drive such as shown in Embodiment-1 is used, the presence and types of disks can be identified by using controller 38 by which all of the trays are sequentially transferred to the drive by using tray carrier 1 for the initialization. However, the total time required for the transfer of all the disks and the total time to place all the disks sequentially on the drive would be very long. Since this would be very phenomenal when a large number of disks are stored and the execution of the other operations would become impossible, so that the operation efficiency of total system would drop sharply.

This effect would be very significant at a condition where the system is operational under a connection to a network. More-over, since an extra disk information sensor, besides the sensor monitoring the spilling of disk or tray has to be provided on the drive, a hike of the component costs and assembling costs is inevitable.

The above-described operation called initialization in this embodiment is conducted according to the below-described procedures. At first, controller 38 sends an instruction to tray carrier 1 commanding a sequential pull-out of all the trays 8f from magazine 2 in a direction shown by arrow (d) shown in FIGS. 19 (A) and 19 (B).

At this time, each of sensors 37a and 37b, consisting of a light emitter and a light sensor respectively, are disposed in mutually opposing positions respectively, corresponding to the disk-type confirming hole 39 and the disk presence confirming hole 40 disposed respectively on the tray 8f, so that the situations of these sensor-holes provided on tray 8f can be confirmed.

Also, an intermediate switch 41, which operates when the disk presence confirming hole 40 provided on tray 8f passes through sensor 37b, is disposed on the tray carrier 1. Although a mechanical switch acting as an intermediate switch is shown, a magnetic or optical switch can be used just as well.

FIG. 19(A) shows a condition where tray 8f is held within the magazine, while FIG. 19(B) shows a condition where tray 8f is pulled out of the magazine causing an operation of intermediate switch 41. FIG. 20 shows the changes in the outputs of intermediate switch 41 and sensor 37b as the tray 8f is being pulled out.

Figure 20:
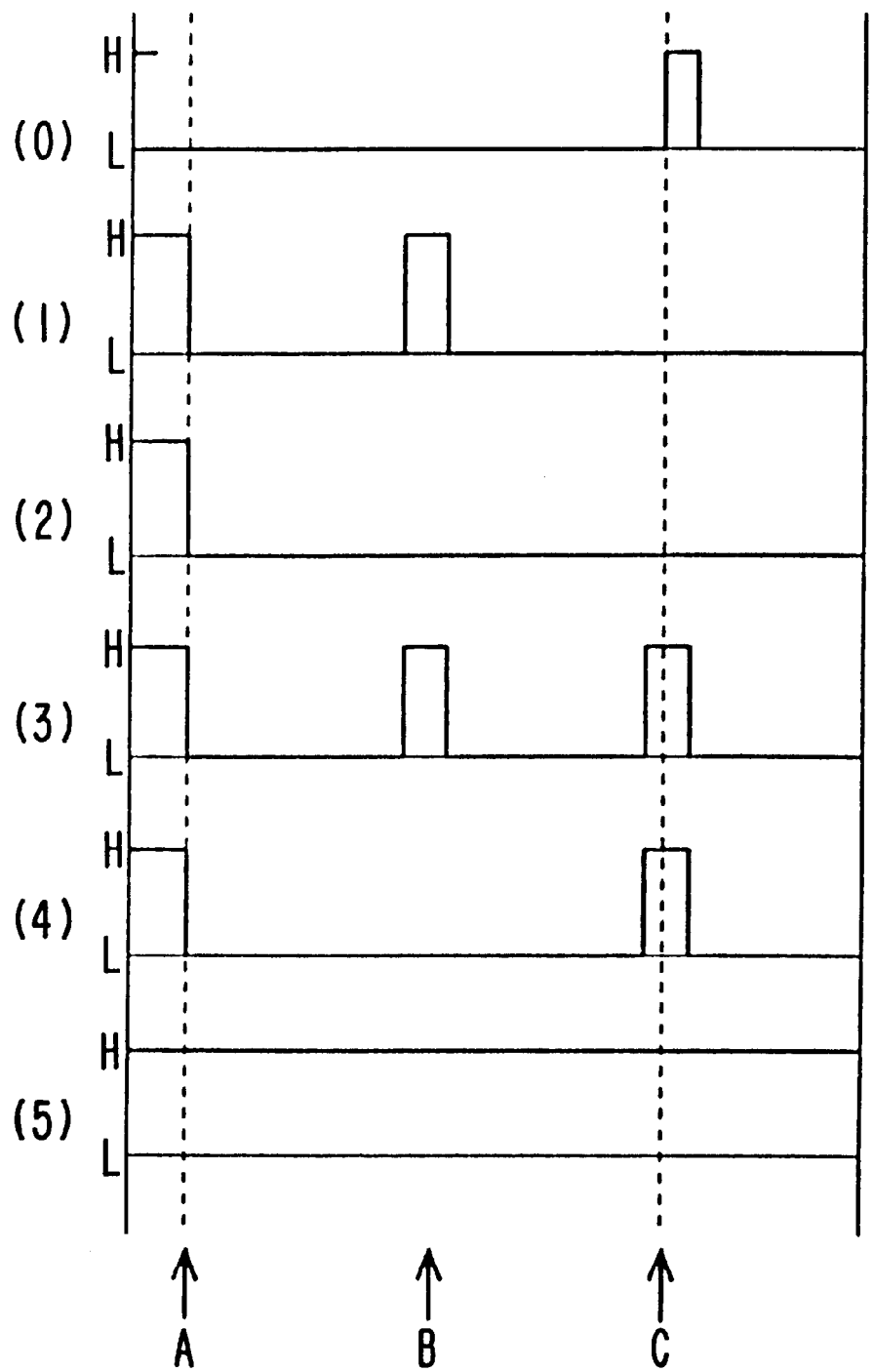
FIG. 20 shows an example of output signal pattern of the sensor in detecting the disk insertion and the disk type in a case shown in FIGS. 19(A) and 19(B).

In FIG. 20, (0) shows the output signal of intermediate switch 41, and (1)–(5) show the changes of the output signal of sensor 37b. Each of these shows a combination of sensor outputs showing various conditions produced by the combinations of the type of disk, presence of disk, presence of tray, etc.

The operation of the intermediate switch is shown by H, while the none-operations of the same are shown by L. Similarly, the light detection of sensor 37b is shown by H, while the none-detection is shown by L, and the other conditions are expressed likewise also. When the tray carrier 1 is instructed by controller 38 to pull out a tray, the outputs of intermediate switch 41 and sensor 37b are monitored simultaneously.

Point-(A) in FIG. 20 corresponds to the condition shown in FIG. 19(A), point-(C) corresponds to the condition shown in FIG. 19(B), and point-(B) corresponds to the period during which disk presence confirming hole 40 passes over sensor 37b. Although the disk type confirming hole 39 can be allocated generally to identify any of conditions including, the open-closed condition, a recording/reproducing possible disk, and a reproducing-only disk, in this embodiment, the opened condition of the hole means a recording/reproducing possible disk, and the closed condition means a reproducing-only disk. Table 1 shows a list of the standards identifying the presence of tray, type of disk, and disk presence when any of the outputs of (1)–(5) is obtained.

TABLE

| Case | No of H→Ls of sensor 37b until the operation of intermediate-switch 41 | Output of sensor 37b when intermediate switch 41 is in H | Disk management information | | |
|---|---|---|---|---|---|
| | | | Presence of tray | Type of disk | Presence of disk |
| (1) | 2 | L | Yes | R/W | Yes |
| (2) | 1 | L | Yes | R | Yes |
| (3) | 2 | H | Yes | R/W | No |
| (4) | 1 | H | Yes | R | No |
| (5) | 0 | H | No | — | — |

Note.
R/W: Recording/reproducing possible disk,
R: Reproducing-only disk.

The controller 38 monitors the outputs of sensor 37b and intermediate switch 41, and memorizes the number of times that the output of sensor 37b changed in a way H→L. At the same time, by detecting the output level of sensor 37b, when the output of intermediate switch 41 becomes H, the presence of tray, type of disk, e.g., whether it is a recording/reproducing possible disk or a reproducing-only disk, and the presence of disk can be confirmed from Table 1.

Specifically, the presence of a tray is confirmed, except in the case where the number of times that the output of sensor 37b is changed in a way H→L is zero, until the intermediate switch 41 is operated. Moreover, the presence of recording/reproducing possible disk is confirmed when the number of times of said phenomena is more than two. The presence of a reproducing only disk is confirmed when the number of times is only one.

Moreover, when the number of times of this phenomena is zero, no presence of tray is confirmed so that the confirmations of the disk type and the presence of disk are not made further.

As for the disk presence information, a condition, where the intermediate switch 41 is in a state of H and the output of sensor 37b is L, is recognized as a presence of disk, while no presence of a disk is recognized when the output is H. Although not shown in Table 1, the condition where the tray or the disk is spilled out of the magazine 2 can be differentiated from either of the cases shown in Table 1, since the signal of sensor 37b is L.

In particular, this case can be recognized as an error where the disk/tray is spilled. By repeating the above-described process for every tray, the initialization process for a sensor pair (37a, 37b) can be conducted by confirming the presence of tray, type of disk, and the disk presence, and the results memorized in the controller. Moreover, the abnormality of disk-spillout-of-tray becomes detectable by this at the same time. Therefore, the initialization can be performed within a short time, since a simple device structure can be employed and the time to transfer the disk one-by-one to the drive for placing can be eliminated.

Furthermore, the drive capable of processing both the recording/reproducing possible disks and the reproducing-only disks, or the drive capable of processing either of these disks can be employed in this embodiment. Even in a case employing a drive dedicated to the recording/reproducing possible disks or a drive dedicated to the reproducing-only disks, the management of disk information can be performed by employing the dedicated trays for each and by performing the same processings. Thus, the device expansion can be easily made if so desired, since the type of disk can be discriminated by employing proper trays.

Moreover, though the disk-type information is manageable by the type of tray in this embodiment, in a case where the drive capable of processing both a recording/reproducing possible disk and a reproducing-only disk is employed, an extra disk type discriminating means may be provided on the drive also. By this, a higher device reliability can be obtained, since the final discrimination can be performed at the drive, even if an erratic disk type information is produced at the controller for some reason or another. The disk-type discrimination means in the drive may be realized by utilizing disk-type discriminating hole 39 disposed on the tray or by using another discriminating hole disposed on the tray.

EMBODIMENTS-9

Figure 21:
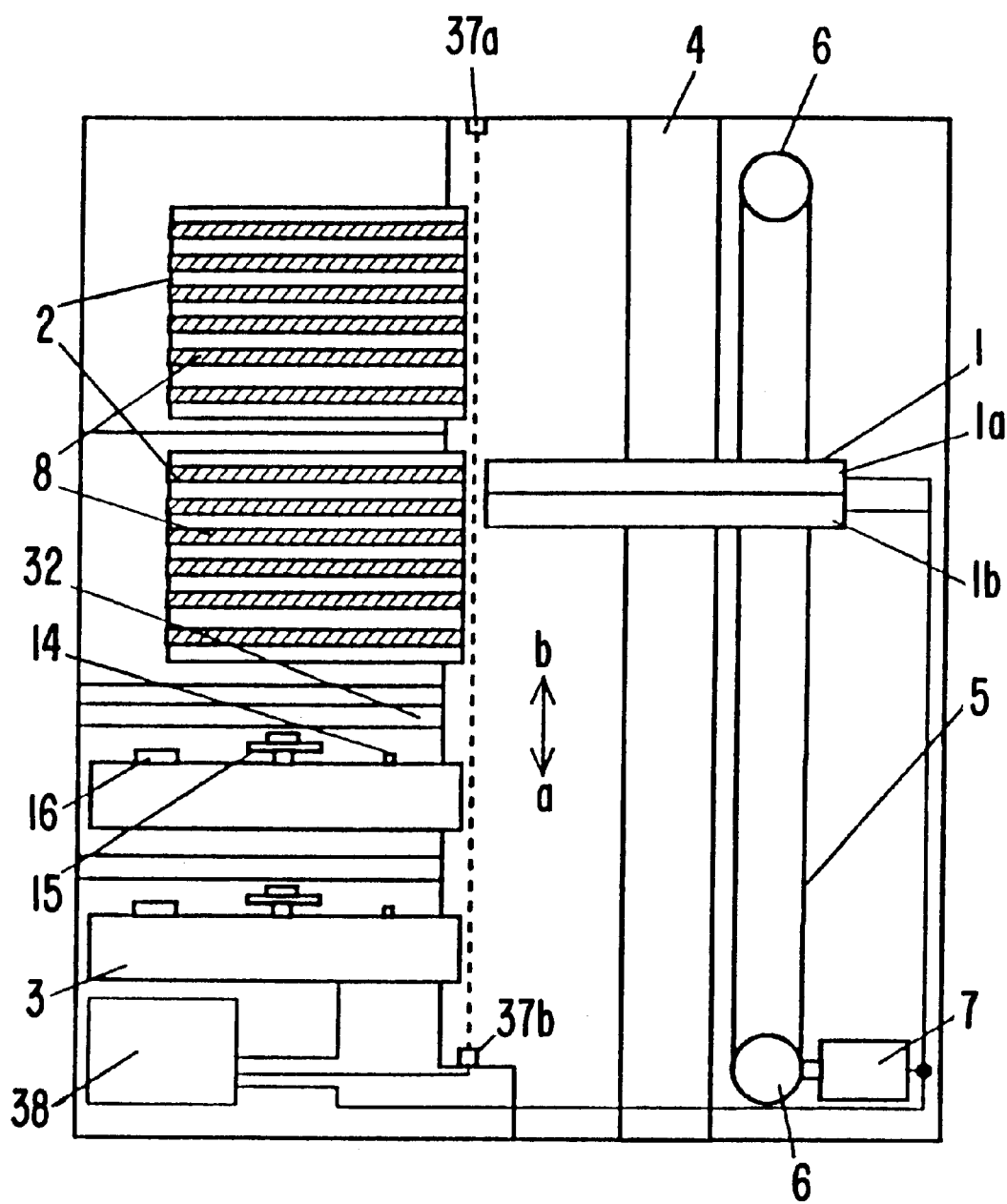
FIG. 21 shows a construction of autochanger which is Embodiment-9.

FIG. 21 shows Embodiment-9 provided with two magazines 2 and two drives 3, and a tray carrier 1 capable of holding plural disks simultaneously. Embodiment-9 is different from Embodiment-8 in these aspects. The tray carrier 1 consists of tray carriers 1a and 1b, and is able to hold two disks simultaneously.

The operations of Embodiment-9 for exchanging a disk held in drive 3 with a disk held in magazine 2 are explained next. This is a common and most frequently performed operation of a disk changer.

When an instruction calling for the exchange one disk with another disk is issued from the controller 38, the tray carrier 1 is moved to the position of the tray in the tray holder 2 where the disk to be processed next is located, and this specified tray is taken out by the tray carrier 1a. The tray carrier 1b is left in an empty condition at this time. The tray carrier 1 is moved in the direction of the arrow (a). Then, the position of tray carrier 1b relative to the loading mechanism 32 is determined. At this time, the tray holding the disk being processed by drive 3 is taken out by loading mechanism 32 and transferred to the tray carrier 1b.

Next, the position of tray carrier 1a relative to the loading mechanism 32 is determined. After determining the position of tray carrier la relative to loading mechanism 32, the tray holding the disk to be processed in next is inserted into loading mechanism 32. Then, the disk is clamped on turntable 15 by loading mechanism 32 and rotated with the signal being readout by the pickup 16.

The return of the disk held in the tray carrier 1b is performed by the operation described next. Tray carrier 1b is moved to a position relative to the predetermined position of the tray holder 2, and the tray is returned to the holder by using the notch 12.

Since these operations are not sequentially performed but rather the next disk to be processed is first obtained and then exchanged with the disk being processed, without first returning the disk being processed into a predetermined tray position, a substantial reduction of the time involved in exchanging disks can be realized. Moreover, since parallel and simultaneous processings of two disks are possible by utilizing two drives 3, a high volume information can be supplied simultaneously.

The detailed explanation of the disk information management conducted in an autochanger of Embodiment-9 is omitted here since these are performed in a way similar to that of Embodiment-8.

However, in a case where all of the trays have to be pulled out of magazine 2 for management of disk information, either of tray carriers, 1a or 1b, has to be used avoiding the simultaneous use of these two, and tray 1a is consistently used in this case.

In Embodiment-9, needless to say that the initialization process is performed by detecting the presence of tray, type of disks, and the disk presence by a sensor pair (sensors 37a and 37b), and by memorizing these results in the controller. Since the abnormal positioning of tray/disk is detectable also, an autochanger of simple construction, performing the initialization processes in a short time can be offered.

EMBODIMENT-10

Figure 22:
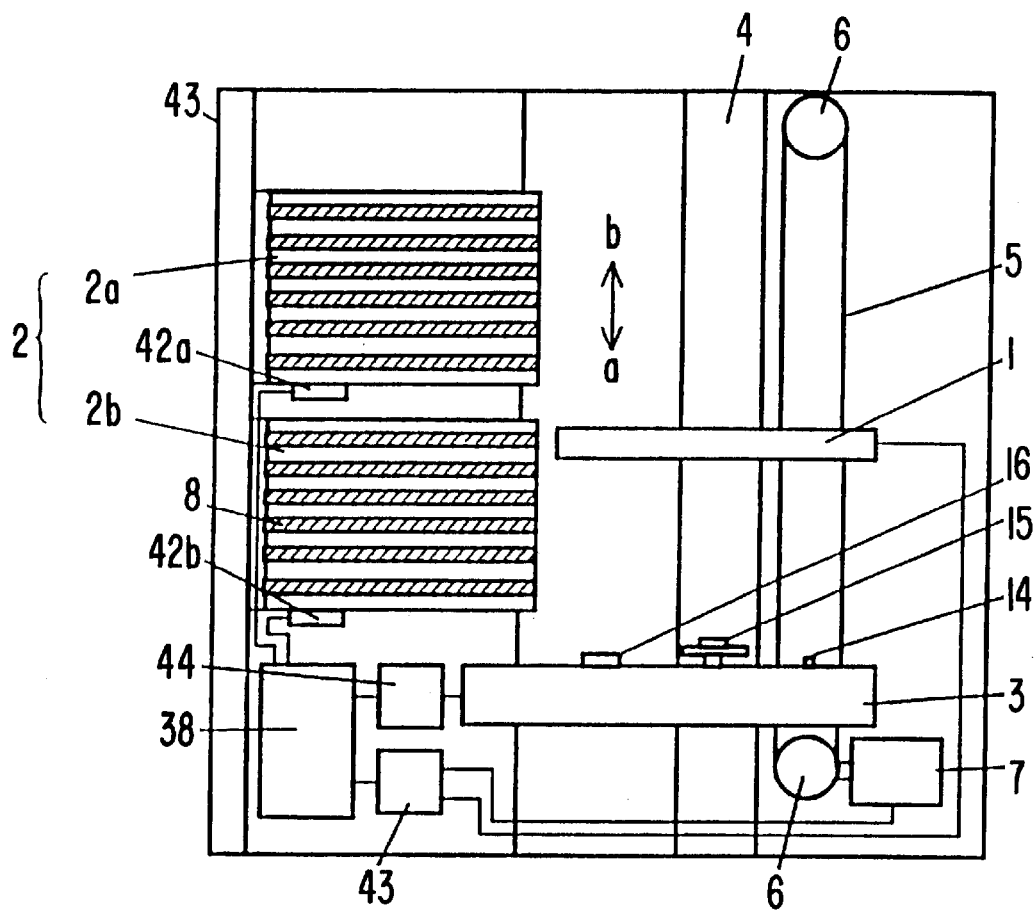
FIG. 22 shows a construction of autochanger which is Embodiment-10.
Figure 23:
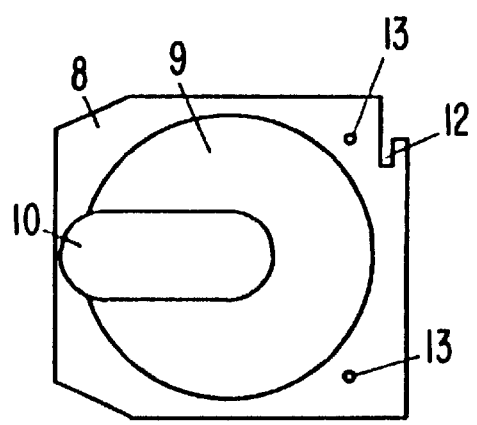
FIG. 23 shows a planar view of the tray used in the automatic disk changer shown in FIG. 22.

Embodiment-10 is next explained by referring FIGS. 22 and 23. A tray 8, holding a disk (not shown), held in a magazine 2 (a or b) is taken out by the tray carrier 1, and is transferred in a direction shown by arrow (a) and placed on drive 3. Tray carrier 1 is guided by a guide shaft 4 and is driven by a belt 5 driven by motor 7 through pulleys 6.

Plural trays 8 are held in magazine 2, which is freely interchangeable by a user by operating the door 45. In addition to this, loading sensors 42a and 42b for detecting the loading or unloading of each magazine 2a and 2b are provided also.

As shown in FIG. 23, there are provided on tray 8: a depression 9 for holding a disk; an opening 10 allowing the passages of pickup 16 and turntable 15; a positioning hole 13 for determining the relative position of the tray to drive 3; and a notch 12 for making the taking in and out of the tray from/to a magazine 2 easy.

Moreover, a turntable 15 for rotating the disk, a pickup 16 for reading out the signal recorded on the disk, and a positioning pin 14 corresponding to positioning hole 13 of tray 8, are provided also on the drive 3 mounted on the autochanger.

Furthermore, a transfer controller 43 controls the driving motor 7 and the tray carrier 1, and a drive controller 44 controls the drive 3. A controller 38 gives driving instructions to the transfer controller 43 and the drive controller 44, and the controller 38 controls and manages the operation of the autochanger and disk information based on the input to the host computer (not shown) and operating buttons (not shown).

Next, the operations of these controllers, when a command to install a disk onto a predetermined drive is externally inputted into controller 38, are explained. Based on the output of controller 38, the transfer controller 43 generates an instruction to start the operations of the driving motor 7 and the tray carrier 1. The tray carrier 1 is thus driven in a direction shown by either arrow (a) or (b) by the driving motor 7 through belt 5, and is moved to a specified position to remove a tray 8.

Then, the tray carrier 1, holding tray 8, is transferred in the direction of arrow (a), and positioning hole 13 of tray 9 is engaged with the positioning pin 14 of the drive 3, thereby determining the position of tray 8 with respect to the drive 3. At this stage, the controller 38 outputs an instruction to drive the controller 44 in order to introduce turntable 15 and pickup 16 on drive 3 through the opening 10, to perform a centering operation of the disk on turntable 15, and to clamp the disk on turntable 15 by means of a clamp (not shown) provided on tray carrier 1.

After this, the turntable 15 is rotated and the signal is readout by the pickup 16. At this condition, tray 8 is positioned on drive 3 and is held within tray carrier 1 at a height avoiding the possible contact with the disk. The return of tray 8 after ending the reproducing operation is conducted in a manner described next.

When the rotation of turntable 15 is stopped by the drive controller 44 according to the instruction signal given by controller 38, the tray carrier 1 is moved by means of the driving motor 7 in a direction shown by arrow (b) by an instruction from the movement or transfer controller 43, after the clamp holding the disk to turntable 15 is released. The disk placed on tray 8 is transferred to a predetermined position of the magazine 2, and is returned into the magazine 2 by utilizing the notch 12.

As explained in Embodiments-8 and -9, the initialization processes of this autochanger at the time of power turn-on begin with a sending of an instruction command from the controller 38 to the transfer controller 43. After this, the disk presence, type of disks, and tray presence are identified by a disk information sensor (not shown) after taking out all of the trays by utilizing the tray carrier. However, the disk-type may well be identified by transferring the tray to drive 3 and by placing the disk on drive 3. The data information recorded on the disk may be identified and the writing of management information may be conducted in a case of recording/reproducing media. The storage of such disk-related information on the controller 38 is conducted in a way similar to the ones described in connection with Embodiments-8 and -9.

Next, the user operation for changing a magazine 2a only is explained. In exchanging the magazine 2a, the signal from the instal sensor 42a is detected by controller 38. If the signal from instal sensor 42b is monitored and the presence of unexchanged magazine 2b is detected, an instruction commanding the before-mentioned initialization of the trays and disks held in the exchanged magazine 2a is outputted to carrier controller 43 and drive controller 44, and only the information relating to the disks held in magazine 2a are updated and the old information held in the unchanged magazine are maintained as they are.

As above-explained, the time required for initialization can be reduced substantially by performing the initialization and by updating the data only with respect to the exchanged magazine. Moreover, a higher operating efficiency of the autochanger and a higher total efficiency of the system including the autochanger can be realized.

Although this embodiment is of a construction capable of changing the disks in a magazine unit, the time for initialization can be reduced likewise if a sensor detecting the exchange of tray or cartridge is provided, even in a case of autochanger holding and managing the disks in an unit of disk-holding tray or cartridge.

Moreover, a disk-type discrimination means may also be provided in the drive when a drive operable for both the recording/reproducing possible disk and the reproducing-only disk is employed.

In Embodiments-1 to -10, though it is most desirable to employ a drive operable for both the recording/reproducing possible disk and the reproducing only disk, the effects would be the same if drives operable only for the recording/reproducing possible disk and drives operable only for the reproducing only disk, in a case where plural drives have to be incorporated.

What is claimed is:

1. An automatic disk changer comprising:

a recording/reproducing device operating a reproducing-only disk and a recording/reproducing possible disk;

disk trays settable on said recording/reproducing device, each of said disk trays having a disk type discriminating means to discriminate whether a disk on the disk tray is a reproducing-only disk or a recording/reproducing possible disk, and a selecting means for selecting the recording possibility of the disk tray, wherein the selecting means is disposed at a position independent of said disk type discriminating means on each of the disk trays;

a magazine attachable/detachable to/from said automatic disk changer, wherein the magazine has an opening and holds said disk trays to expose said selecting means of each of the disk trays at the opening; and a tray carrier able to pull-out/insert one of said disk trays from/into said magazine, and able to transport said disk tray to and from said recording/reproducing device.

2. An automatic disk changer comprising:

a recording/reproducing device operating a reproducing-only disk and a recording/reproducing possible disk;

disk trays mountable on said recording/reproducing device, each of said disc trays provided with a disk presence detecting means, and provided with a disk type discriminating means able to discriminate whether a disk on the disk tray is a reproducing-only disk or recording/reproducing possible disk, wherein said disk presence and said disk-type discriminating means are disposed on a straight line parallel to the pulling-out direction of the disk tray;

a tray storage holding said disk trays;

a disk information sensing means sensing information of said disk presence detecting means and said disk type discriminating means;

a tray carrier able to take-out/insert one of said disk trays from/into said tray storage, and able to transfer said disk trays to/from said recording/reproducing device, said tray carrier having a middle position detecting means that is operated when said disk tray is pulled out to a position, wherein said disk presence detecting means or said disk type discriminating means is detected by said disk information sensing means; and a detecting and processing means for detecting and processing information of disk type, disk presence and tray presence by using output signals of said middle position detecting means and said disk information sensing means.

3. An automatic disk changer according to claim 2, wherein each of said disk presence sensing means and each said disk-type discriminating means comprises a through-hole or a notch.

4. An automatic disk changer according to claim 2, wherein each of said disk presence sensing means and disk-type discrimination means comprises a through-hole or notch, and wherein said disk information sensing means is disposed at a position detecting the protrusion of one of said trays or disks from said tray storage.

* * * * *